United States Patent
Kochergin et al.

(10) Patent No.: US 7,139,459 B2
(45) Date of Patent: *Nov. 21, 2006

(54) SPECTRAL FILTER FOR GREEN AND LONGER WAVELENGTHS

(75) Inventors: Vladimir Kochergin, Westerville, OH (US); Philip Swinehart, Columbus, OH (US)

(73) Assignee: Lake Shore Cryotronics, Inc., Westerville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/686,520

(22) Filed: Oct. 16, 2003

(65) Prior Publication Data

US 2005/0276536 A1    Dec. 15, 2005

Related U.S. Application Data

(60) Provisional application No. 60/418,361, filed on Oct. 16, 2002.

(51) Int. Cl.
G02B 6/02 (2006.01)
G02B 6/10 (2006.01)

(52) U.S. Cl. .................. 385/128; 385/146

(58) Field of Classification Search ........ 385/128–132, 385/146; 359/361; 205/124, 655
See application file for complete search history.

(56) References Cited

U.S. PATENT DOCUMENTS

| | | | |
|---|---|---|---|
| 4,689,021 A | 8/1987 | Vasiliev et al. | 434/234 |
| 4,689,125 A * | 8/1987 | Burrus et al. | 205/655 |
| 4,874,484 A | 10/1989 | Foell et al. | 438/750 |
| 5,262,021 A | 11/1993 | Lehmann et al. | 205/655 |
| 5,348,627 A | 9/1994 | Propst et al. | 205/655 |
| 5,431,766 A | 7/1995 | Propst et al. | 156/345.15 |
| 5,544,772 A | 8/1996 | Soave et al. | 216/2 |
| 5,645,684 A | 7/1997 | Keller | 148/33.2 |
| 5,987,208 A * | 11/1999 | Gruning et al. | 385/146 |
| 5,997,713 A | 12/1999 | Beetz, Jr. et al. | 205/124 |
| 6,004,450 A | 12/1999 | Northrup et al. | 205/656 |
| 6,301,421 B1 * | 10/2001 | Wickham et al. | 385/126 |
| 6,468,823 B1 | 10/2002 | Scherer et al. | 438/31 |
| 6,483,640 B1 | 11/2002 | Tonucci et al. | 359/361 |
| 6,521,149 B1 | 2/2003 | Mearini et al. | 264/81 |
| 6,526,191 B1 | 2/2003 | Geusic et al. | 385/14 |
| 6,711,200 B1 * | 3/2004 | Scherer et al. | 372/64 |

(Continued)

FOREIGN PATENT DOCUMENTS

DE    4202454    7/1993

(Continued)

OTHER PUBLICATIONS

Lehmann et al., Optical shortpass filters based on macroporous silicon *Appl. Phys. Lett.* V 78, N.5, Jan. 2001.

(Continued)

*Primary Examiner*—Kaveh Kianni
(74) *Attorney, Agent, or Firm*—Nixon & Vanderhye P.C.

(57) ABSTRACT

Visible and infra-red spectral filters based on arrays of uncoupled identical waveguides having coherently modulated cross sections offer many unique advantages, such as independence of the spectral position of the Bragg-resonance based transmission or reflection features on the angle of light incidence. The resulting spectral filters are mechanically and optically stable, do not degrade over time, and offer superior transmittance for use as band pass, narrow band pass, band blocking, short pass and long pass filters. Such filters are useful for a wide variety of applications including but not limited to biomedical analysis systems, spectroscopy and optical communications systems.

60 Claims, 21 Drawing Sheets

U.S. PATENT DOCUMENTS

| | | | |
|---|---|---|---|
| 2003/0123827 A1* | 7/2003 | Salerno et al. | 385/129 |
| 2004/0004779 A1* | 1/2004 | Kochergin et al. | 359/885 |
| 2004/0069948 A1* | 4/2004 | Feisst et al. | 250/343 |
| 2005/0058414 A1* | 3/2005 | Kochergin | 385/120 |
| 2005/0175304 A1* | 8/2005 | Romagnoli et al. | 385/129 |

FOREIGN PATENT DOCUMENTS

| | | | |
|---|---|---|---|
| DE | 100 63 151 | * | 6/2002 |

OTHER PUBLICATIONS

J. Schilling et al., "Three-dimensional photonic crystals based on Macroporous silicon with modulated pore diameter", *Appl. Phys. Lett.* V 78, N.9, Feb. 2001.

S. Izuo et al., "A novel electrochemical etching technique for n-type silicon," *Sensors and Actuators* A 97-98 (2002), pp. 720-724.

A. Vyatkin et al., "Random and Ordered Macropore Formation in p-Type Silicon," *J. of the Electrochem. Soc.*, 149 (1), pp. G70-G76 (2002).

S. Langa et al., "Observation of crossing pores in anodically etched n-GaAs," *Appl. Phys. Lett.* 78(8), pp. 1074-1076, (2001).

M. Christophersen et al., "A comparison of pores in silicon and pores in III-V compound mateials", *Phys. Stat. Sol. A*, 197 (1), pp. 197-203, (2003).

H. Föll et al., "Pores in III-V Semiconductors", *Adv. Materials, Review*, 2003, 15, pp. 183-198, (2003).

S. Langa et al., *Phys. Stat. Sol. A*, 197 (1), p. 77, (2003) "Single crystalline 2D porous arrays obtained by self organization in n-InP" (pp. 77-82).

K. Barla et al., "X-Ray Topographic Characterization of Porous Silicon Layers," *J. Cryst. Growth*, 68, North-Holland, Amsterdam, p. 721-726 (1984).

B.H. Erne et al., "Porous Etching: A Means to Enhance the Photo response of Indirect Semiconductors," *Adv. Mater.*, 7, p. 739-742 (1995).

P.A. Kohl et al., J. Electrochem. Soc., 130, p. 2288 (1983).

Schmuki P. et al., *Physica Status Solidi A*, "Pore Formation on n-InP," 182 (1), pp. 51-61, (2000).

S. Langa et al., "Formation of Porous Layers with Different Morphologies during Anodic Etching of n-InP," *J. Electrochem. Soc. Lett.*, 3 (11), p. 514-516, (2000).

D.J. Lockwood et al., "Optical properties of porous GaAs," *Physica E*, 4, pp. 102-110 (1999).

Schmulki, P. et al., "Formation of porous layers on InSb(100) by anodization," *Phys. Stat. Sol.* (a) 197, No. 1, pp. 71-76 (2003).

Langa, S. et al., "Voltage oscillations—an emergent property at high density pore growth," *Phys. Stat. Sol.* (a) 197, No. 1, pp. 186-191 (2003).

Vladimir Kochergin, "Omnidirectional Optical Filters," Kluwer Academic Publishers (2003).

Tokranova et al., "Fabrication of MEMS Devices with Macroporous Silicon Membrane Embedded with Modulated 3D Structures for Optimal Cell Sorting," *Mat. Res. Soc. Symp. Proc.* vol. 752, pp. 315-320 (Dec. 2, 2002).

H H. Föll et al., "Porous III-V compound semiconductors: formation, properties, and comparison to silicon", *Phys. Stat. Sol. A*, 197 (1), pp. 61-70 (2003).

S. Langa et al., *Phys. Stat. Sol.* (A), 195 (3), "Electrochemical pore etching in Ge," R4-R6 (2003).

Macleod H.A., *Thin-Film Optical Filters*, 3rd ed., Institute of Physics Publishing, 2001.

* cited by examiner

SPECTRAL FILTER FOR GREEN AND LONGER WAVELENGTHS

CROSS-REFERENCES TO RELATED APPLICATIONS

This application claims the benefit of provisional application No. 60/418,361 filed Oct. 16, 2002, incorporated herein by reference. This application is related to commonly assigned copending application Ser. No. 10/686,519 of Kochergin et al. filed concurrently herewith entitled "METHOD OF MANUFACTURING A SPECTRAL FILTER FOR GREEN AND LONGER WAVELENGTHS" also incorporated herein by reference.

STATEMENT REGARDING FEDERALLY SPONSORED RESEARCH OR DEVELOPMENT

Not applicable.

FIELD

The technology herein relates to optical filters, and more specifically to optical filters constructed of artificially structured materials. Still more particularly, the technology herein relates to bandpass, narrow bandpass and band-blocking optical filters having significantly improved optical performance, manufacturability, extended physical longevity, transmitted wavelength stability and cost.

BACKGROUND AND SUMMARY

Generally, optical filters and coatings are passive components whose basic function is to define or improve the performance of optical systems. There are many types of optical filters and they are used for a broad range of different applications. One common type of optical filter is a sunglass lens. Polarized sunglass lenses filter out light with a certain direction of polarization in addition to reducing the sun's intensity. Applications of optical filters and coatings can be diverse as in anti-glare computer screens, colored glass, sighting devices, and electrical spark imagers—to name just a few.

Some optical filters are specialized for different wavelength ranges of light because of limitations in available materials that are optically transparent in the range of interest. For example, many applications and instruments require optical filters that can be used to tune the optical behavior of light in the near infrared, mid infrared or far infrared wavelength range (i.e., at frequencies of radiant energy that are generally below the frequencies of visible light). Some example applications for such filters include far- and mid-IR focal-plane arrays for military applications, chemical sensing, astronomy, wavelength division multiplexing in optical communications, space observations to name a few.

Much work has been done in the past to develop useful optical filters and coatings for different wavelength ranges. Widely spread filter types include: absorption-based filters (i.e., filters where the rejection of light is caused by absorption in filter material) and interference-based filters (i.e., filters where the rejection of light is caused by reflectance from multiple layers composing the filter). Detailed discussion of such filters can be found in for example Macleod H. A., *Thin-Film Optical Filters,* 3rd ed., Institute of Physics Publishing, 2001.

Exemplary Absorption Type Filters

Absorption filters generally consist of a thin film or slide of material that has an absorption feature (band or edge) at the required wavelength or incorporates an optically excitable material, such as a color center. Filters that utilize semiconductor material can serve as an illustrative example of an edge absorption filter (more particularly long-pass filters). Semiconductors are known to have an absorption band that extends to some characteristic wavelength, which corresponds to the bandgap energy of a particular semiconductor. The transmission/rejection edge could be made very sharp for a semiconductor layer thicknesses above 100 μm. Absorption band edge of different semiconductors and semiconductor composites can vary from ~500 nm for gallium phosphate (GaP) and aluminum arsenate (AlAs) to more than 2 μm for indium arsenate (InAs) and InSb. The absorption band edge can be smoothly tuned by adjusting the semiconductor composition (for example, $Al_xGa_{1-x}As$ absorption band edge tunes quite linearly from 2.1 eV for x=1 to 1.4 for x=0), long-pass filters can be obtained with a reasonably sharp edge for any wavelength at the ~500 to 2400 nm range). However, at least some semiconductor-based long-pass filters have a significant disadvantage—i.e., high reflection losses caused by the high refractive index of semiconductor materials. Such a problem is usually solved by antireflection coatings of both semiconductor surfaces in the case of semiconductor wafer (or slide) used or, in the case of thin film semiconductor material, of the top and between the substrate and the layer of semiconductor material. However, such an approach can also have some significant disadvantages While the absorption edge shape and position of uncoated semiconductor film does not depend on angle of incidence (only the degree of an absorption value changes), both the absorption edge shape and position of antireflection-coated semiconductor film depend on angle of incidence. Hence, the filter can in at least some cases be used effectively only for some limited angular range. In addition, semiconductor absorption edges show strong temperature dependence. It also should be noted that semiconductor-based absorption filter cannot be used as a band-pass or narrow-band pass filtering, since the absorption bands of semiconductors are generally wide.

Other materials that are sometimes used to form absorption filters include colored-glass filters (for example, Schott glass filter). Such colored-glass filters generally operate through the process of ionic absorption of inorganic material, dispersed uniformly through the glass slide or through the absorptive scattering of crystallites formed within the glass. Such filters generally offer fairly wide design freedom in terms of absorption band position and can be arranged either in short-pass, long-pass or band-blocking forms. The significantly lower refractive index of such filters as compared to semiconductor filters make the reflection losses lower. The temperature dependence of the rejection band edge position of such filters is also lower than that of semiconductors. However, such filters can also suffer from considerable limitations. For example, the transmission through the transparency range of such filters is usually not very uniform. Therefore, such filters in some cases cannot tolerate high power and/or are not well-suited for narrow bandpass filters.

Exemplary Interference Type Filters

Generally, the basis of interference filters is a Fabry-Perot interferometer. A Fabry-Perot (FP) interferometer can be imagined as a thin film having two flat surfaces that are parallel to each other and coated with relatively high-reflectance coatings. In practice, a different realization of Fabry-Perot interferometer is common—the so-called Fabry-Perot etalon, which consists of two flat plates separated by a distance d and aligned parallel to each other with a high degree of accuracy. The separation is usually maintained by a spacer ring made of quartz or Invar, and the inner surfaces of the two plates are usually coated to enhance their reflections. The spectral dependence of the transmittance through an FP interferometer contains peaks and valleys. The peaks of transmittance are known as fringes. It can be proven that the maximum values of transmittance at the peaks reach unity if the Fabry-Perot interferometer is constructed from nonabsorptive materials.

The classic design of a high-reflectance coating is based on alternating quarter-wave layers of two different materials. The high reflectance in a quarter-wave layer stack takes place because the light beams, reflected from all the interfaces in the multilayer, are in phase when they reach the front surface where constructive interference of all the reflected waves occurs. As with the Fabry-Perot etalon, the reflectance spectrum of such a multilayer contains multiple reflection peaks corresponding to the phase-matching conditions of the reflected waves at the different interfaces. However, these reflection maximums are considerably wider than that of the Fabry-Perot etalon. The width of the high reflectance plateau depends on the refractive index contrast between the low and high refractive index materials that compose the high reflectance multilayer. As follows from the above discussion, the high-reflectance dielectric multilayer can be constructed to have very high reflectance over a wide range of wavelengths. However, such multilayers can have some disadvantages. One possible disadvantage is that the high reflectance zone of such a reflector, although it can be made wide, is still limited. Moreover, since the reflectance peaks are located where the waves reflected from each interface in multilayer are in phase, the wavelength positions for the reflectance peaks may strongly depend on the angle of incidence, similar to the Fabry-Perot etalon case.

A quarter-wave stack can be considered as the basic type of interference edge filter. The transmission spectrum of the quarter-wave stack contains alternating low- and high-reflectance zones and, hence, alternative high- and low-transmittance zones. Such a filter can be used as a long-pass filter or as a short-pass filter. Edge wavelengths can be tuned by changing the wavelength at which the stack is quarter-wave. Such an edge filter will be suitable for relatively narrowband applications, that is, when the width of the rejection zone is greater than the spectral width of light to be eliminated. For all other cases, the required elimination of all wavelengths shorter than (or longer than) a particular value requires a different filter design.

Perhaps the simplest design of a narrowband-pass filter is the Fabry-Perot filter discussed previously. However, the spectral pass-band shape of the Fabry-Perot filter is triangular. In addition, the original design generally may require two precisely aligned and spaced high-flatness plates, which may not be practical for many applications. Therefore, narrowband-pass filters are usually made in slightly modified form with respect to a Fabry-Perot etalon. A Fabry-Perot thin film filter is a thin film assembly consisting of a dielectric layer bounded by either two metallic reflecting layers or by two multilayer dielectric reflectors. The realization of a Fabry-Perot filter with metallic reflective layers is called a metal-dielectric Fabry-Perot filter, while a Fabry-Perot filter with two dielectric multilayer reflectors is called an all-dielectric Fabry-Perot filter.

The metal-dielectric Fabry-Perot filter is perhaps the simplest realization of a narrowband-pass filter. In such filters, the dielectric layer, surrounded by metal reflection layers, serves as a spacer in the Fabry-Perot etalon. and therefore, is called a spacer layer. The metallic reflective layers must provide reasonably high reflectivity at the surface while keeping losses as low as possible. For the visible region of the spectrum, silver is an optimal metal, while for ultraviolet and deep ultraviolet aluminum is the preferred material. However, other metals can be used as well.

The degree of light absorption is perhaps the biggest disadvantage of metal-dielectric narrowband-pass filters. Although absorption during a single reflection from thin metal film is small and absorption during transmission also can be minimized by using thin metal films, in a Fabry-Perot cavity absorption is greatly enhanced due to multiple reflections of the transmitted light. Metal-dielectric Fabry-Perot filters have the same dependence of the transmittance peak wavelength as the Fabry-Perot cavity. In addition to this disadvantage, the absorbance of such a filter strongly depends on the angle of incidence. Such filters are usually used in applications where other filters, such as all-dielectric Fabry-Perot filters, are prohibited by either cost or other factors, such as the inability to function in the deep UV.

As was discussed above, in the all-dielectric Fabry-Perot filter the metallic reflecting layers are replaced by high-reflectance dielectric multilayers. Two different cases of such filters can be considered: {Air| H L H L . . . H L H H L H . . . L H L H| Substrate} and {Air| H L H L . . . L H L L H L . . . L H L H| Substrate}, where H indicates the higher index of refraction and L indicates the lower index of refraction. The refractive indices of the layers adjacent to air and the substrate should be high to maximize the reflection from the multilayer. The transmission spectrum of an all-dielectric Fabry-Perot will be a narrow maximum within a broad minimum. The width of the maximum and the transmittance at the maximum will depend upon the reflectivities of the two multilayer stacks.

The central position of the transmittance peak in the all-dielectric Fabry-Perot filters is generally the same as for air cavity Fabry-Perot filters. However, the effect of variations in angle of incidence can be more severe for narrowband-pass filters than that of bandpass, band edge or multilayer reflectors due to a generally narrow transmittance peak. Shifts of the central position of the transmittance peak as strong as 800% in terms of the transmittance peak half width at just a 30 degrees tilt are not uncommon. Such a strong angular dependence of the transmittance spectra of all-dielectric Fabry-Perot filters causes strong dependence of the transmittance spectra on the convergence (or divergence) of the incident beam. Hence, all-dielectric Fabry-Perot filters are often suitable only for plane-parallel or slightly convergent or divergent beams, which causes additional complexity in the optical designs employing such filters.

As was discussed above, the transmitted spectral shape of the all-dielectric Fabry-Perot filter is generally not ideal. For many filter purposes, a nearly rectangular shape of the transmittance spectra is desired. In addition, the maximum achievable rejection in the rejection zone of the filter and the bandwidth of the transmission zone are related. That is, for a given rejection factor, the bandwidth value of the filter is predetermined if the refractive indices of the layers in the filter are fixed. The solution of this problem was found in using multiple-cavity filter designs.

Exemplary Multi-Cavity Interference Filter Designs

Perhaps the simplest type of multiple cavity filter is a double-cavity filter. Such a filter has the structure of {Air|reflector|half-wave spacer|reflector|half-wave spacer|reflector|Substrate}. Such a structure can have some advantages with respect to a single-cavity design. However, for some applications such as dense wavelength division multiplexing (DWDM), a better spectral shape may be needed. The important criteria in high-performance, narrow-band-pass filters are steeper edges and a flatter top on the transmission peak. For two-cavity filter designs, the peaks at both sides of pass band (so-called "rabbit's ears") are prominent. In this case the number of cavities needed can be considerably more than two to reduce the "rabbit's ears."

Although at normal incidence the advantages of multiple-cavity filters are generally strong, the effects of variations of angle of incidence and beam divergence on the transmittance spectra can be more severe for multiple-cavity, all-dielectric Fabry-Perot filters than for single cavity filters. This occurs because the rectangular shape of the pass band of the multiple-cavity filter is due to phase matching between the light waves reflected from the different reflector stacks in the multiple-cavity structure. The phase-matched conditions hold only for a distinct angle and wavelength. Unlike single-cavity filters, where the transmittance peak generally experiences a wavelength shift when illuminated at non-normal angles without significant perturbation of its shape, in multiple-cavity, all-dielectric Fabry-Perot filters the shape of the transmittance band generally changes dramatically with variations in the angle of incidence. The flat top of the multiple-cavity filter at normal incidence frequently resolves into separate narrow transmittance peaks related to the interference between the waves reflected from different reflector stacks within the multiple-cavity multi-layer structure. Hence, multiple cavity, all-dielectric Fabry-Perot filters can become unusable at incident angles more than 3 to 5 degrees from normal incidence. Such a property is important in DWDM filters where several hundred layers may be required to produce flat topped transmittance bands with bandwidths narrower than 1 nm. Additional precise mechanical alignment may solve this problem, but with additional complexity and resultant additional cost.

In addition, multiple-cavity, all-dielectric Fabry-Perot filters generally require the incident beam to be highly collimated. The shape of the pass band of such filters degrades significantly even for Gaussian beams, the convergence (or divergence) angle of which is about 10–15 degrees. Hence, multiple-cavity, all-dielectric Fabry-Perot filters generally can require not only precise mechanical alignment to ensure normal incidence of the beam, but also a high degree of collimation. Several other significant disadvantages exist with multiple-cavity, all-dielectric Fabry-Perot filters. These disadvantages may include the presence of long-wave pass bands (i.e., wavelength-limited rejection bands) and significant difficulties in manufacturing such filters for short wavelength spectral ranges (deep and far ultraviolet). For the applications that require the useful filter properties in the UV ranges, multiple-cavity metal dielectric filters are usually used. In particular, it has been found that, in addition to the disadvantages of an all-dielectric Fabry-Perot filter such as the relationship between pass-band bandwidth and maximum obtainable rejection and the resultant triangular shape of the pass band, the single-cavity metal-dielectric Fabry-Perot filters exhibit increased losses with decrease of the pass-band bandwidth due to the losses in the metal.

In multiple-cavity, metal-dielectric Fabry-Perot filters, this problem is usually solved by an induced-transmission design. This phenomenon serves as the basis of such filters so that it is possible to match metal layers and dielectric spacer thicknesses such that, for a given wavelength and angle of incidence, the localization of the light in the metal layers during transmission is minimal at the same time it is maximized inside the dielectric layers. Using such a design, it is still usually not practical or possible to achieve perfect transmission. However, the transmission can be made somewhat greater than 50%, combined with near square pass band shape and simultaneously good control of rejection and pass band bandwidth. Multiple-cavity metal-dielectric filters can, however, have some significant disadvantages. In addition to an angular shift of the wavelength position of the pass band due to absorption in metal layer, such filters may not be suitable for high-power applications. The temperature dependence of the optical performance of such filters also can be the strongest among all interference-based filters.

Exemplary Spectral Filter Implementations

Various different designs for spectral filters are known. Among them it worthwhile to mention ultraviolet optical filter disclosed in Lehmann et al., *Appl. Phys. Lett.* V 78, N. 5, January 2001. The filter configuration of Lehmann et al., *Appl. Phys. Lett.* V 78, N. 5, January 2001 is based on the spectral filtering of light in an array of leaky waveguides in the form of pores in Macroporous Silicon ("MPSi"). One such an illustrative method of optical filter manufacturing consists of forming a freestanding macropore array from N-doped Si wafer in fluoride-containing electrolyte under certain backside illumination conditions. Precise control over the pore distribution across the surface of the wafer may be possible if preliminary patterning of the silicon wafer surface with regularly distributed depressions (so-called "etch pits") is performed. A method of manufacturing such filters by forming of free-standing macropore arrays from n-doped Si wafer can be found for example in U.S. Pat. No. 5,262,021 issued to V. Lehmann et al. Nov. 16, 1993. Lehmann also discloses the use of such arrays as optical filters. However, it appears that the method of removing the macroporous layer from the Si wafer, as disclosed in U.S. Pat. No. 5,262,021, will result in the second surface of the macroporous layer being inherently rough, causing higher losses due to scattering. Lehmann seems to use the MPSi layer without any further modifications. Thus, while such filters exhibit some short-pass filtering, the transmission spectral shape through them may be unusable for commercial applications due to the wide blocking edge.

Macroporous silicon layers with modulated pore diameters throughout the pore depth is disclosed in, for example, U.S. Pat. No. 5,987,208 issued to U. Gruning and V. Lehmann et al. Nov. 16, 1999 or J. Schilling et al., *Appl. Phys. Lett.* V 78, N. 9, February 2001. These structures may not exhibit advantageous properties such as independence of the spectral response of the filter on the angle of incidence for at least two reasons. First—the structure of these filters (i.e. hexagonal array of pores) may not be suitable to act as an array of waveguides, so the filtering may be directly affected by the angle of incidence of light on the structure. Second, the pore modulation period, pore array period and the Bragg wavelength seem to be chosen so that the light, while traveling through such structure effectively averages the dielectric properties of the structure (similar to what happens in microporous silicon-based filters). The resulting optical behavior will therefore likely resemble that of ordinary interference filters.

FIG. 1 is a diagrammatic perspective view of an exemplary prior art freestanding MPSi uniform pore array section wherein the pores form a uniform cubic lattice. The FIG. 1 exemplary prior art spectral filter consists of air- or vacuum-filled macropores 1.2 starting from the 1$^{st}$ surface 1.3 of the filter wafer and ending at the 2$^{nd}$ surface 1.4 of the filter wafer host 1.1. The macropores 1.2 are disposed such that an ordered uniform macropore array is formed (the ordering may be a key attribute). The pore ends are open at both first and second surfaces of the silicon wafer 1.1. Since silicon is opaque in the deep UV, UV, and visible and part of the near IR wavelength ranges, light can pass through the structure shown in FIG. 1 only through the pores. As shown in FIG. 2, the silicon absorption coefficient k is very high at wavelengths below ~400 nm and moderately high at wavelengths below ~900 nm, which blocks all radiation coming through the silicon having a thickness of 50 micrometers or more.

Since pore diameters of 100 nm to 5000 nm are comparable with the wavelength of light and due to the high aspect ratios possible in MPSi structures ((usually above 30), the transmission through such a macroporous structure at wavelengths below about 700 nm takes place through leaky waveguide modes. In such leaky waveguide modes, the cores of the leaky waveguides are air or vacuum-filled, while the reflective walls of the leaky waveguides are the pore walls. This can be seen in FIG. 2 by the near-metallic behavior of the refractive index n and absorption coefficient k of silicon at wavelengths below ~370 nm. Hence, MPSi material can be considered as an ordered array of leaky waveguides. By means of the high absorption of the walls, each leaky waveguide pore can be considered to be independent of the others in the visible, UV and deep UV spectral ranges if they are separated by silicon walls with thicknesses >20–100 nm.

In the near IR and IR wavelength ranges, the nature of the transmission through the filter of FIG. 1 changes. This happens because silicon becomes less opaque at 700–900 nm and becomes transparent at wavelengths starting approximately from 1100 nm. Light at these wavelengths can pass through the MPSi structure of FIG. 1 not only through the pores, but also through the silicon host. Due to the porous nature of the silicon host, the transmission of light propagating at the angles close to the perpendicular directions to the surface of the MPSi structure occurs through waveguide modes confined in the silicon host for the wavelengths comparable to the pitch of the pore array. As a high refractive index material, silicon can support waveguide modes if surrounded by a lower refractive index material (air or vacuum).

Since close packing of the pores is essential for efficient transmission through the filter of FIG. 1, such a structure can be considered to some approximation in the near IR and IR wavelength ranges as an array of Si waveguides in an air host. For the light propagating at oblique angles to the axes of the waveguides, a non-waveguiding channel of transmission through the structures of FIG. 1 arises. However, such transmission is accomplished by strong reflection and scattering and in the far field of the filter and in many cases such a transmission channel can be neglected. In the near field, however, such a transmission channel usually should be taken into account. When the wavelength of light becomes much larger than the pore array pitch, the light starts interacting with the MPSi layer as if it were a single layer of uniform material having its dielectric constants averaged through the pores and the host. As an illustration, for a square array of pores with 4 micrometer pitch, transmission takes place starting approximately at a wavelength of 20 micrometers.

For purposes of certain analysis, only the waveguide channel of transmission through the MPSi structure of FIG. 1 can be considered. The non-waveguide transmission channel may be neglected. As will be shown below, the latter transmission channel can be completely suppressed.

To take absorption-based losses into account, the optical loss coefficient, $\alpha$, having dimensions cm$^{-1}$, will be used to characterize the optical transmission. The amount of light still remaining in the pore leaky waveguide or Si host waveguide after it travels a length l is proportional to exp($-\alpha(\lambda)$l), and the light remaining in the MPSi layer at the distance l from the first MPSi layer interface is equal to $I_0$ P($\lambda$) exp ($-\alpha(\lambda)$l), where $I_0$ is the initial intensity of the light entering the pore and P($\lambda$) is the coupling efficiency at the first MPSi interface. The optical loss coefficient is, in turn, a function of pore size, geometry, distribution, and wavelength. It is also dependent upon the smoothness of the pore walls. Roughness in the walls introduces another source of light absorption, i.e., scattering, which is proportional to the roughness to wavelength ratio.

An illustrative, numerically calculated spectral dependence of loss coefficients for the prior art MPSi filter of FIG. 1 is given in FIG. 3. The pore array is of cubic symmetry and is made up of 1×1-micrometer vacuum-filled pores in this example. It follows from this illustrative plot that for the chosen pore array dimensions, transmission through pore leaky waveguides is dominant up to about 700 nm and the transmission through the silicon host waveguides is dominant starting from about 800 nm. At 700–800 nm, both transmission mechanisms compete with each other. The increase of the losses through leaky waveguides with increasing wavelength is due to both the reduction of the reflection coefficient of silicon and to the redistribution of the leaky waveguide modes over the pore cross-sections. The modal field penetration into the silicon host material, as well as the optical losses, increase with the wavelength.

Depending on pore size and pore array geometry, leaky waveguides in the deep UV, UV, VIS spectral ranges and waveguides in the near IR and IR spectral ranges can be either single mode (i.e., supporting only the fundamental mode) or multimode (higher order modes are also supported). The amount of light remaining at the distance l into the pore from the first MPSi filter surface can be estimated as $$I_0\{\Sigma P_{i,j}^{LW}(\lambda)\exp(-\alpha_{i,j}^{LW}(\lambda)l)+\Sigma P_{i,j}^{W}(\lambda)\exp(-\alpha_{i,j}^{W}(\lambda)l)\}$$

where the i,j are the mode order indices, introduced as follows: i=j=0 corresponds to the fundamental mode and so on; $P_{i,j}^{W}(\lambda)$ is the coupling efficiency into i,j-th waveguide mode, $P_{i,j}^{LW}(\lambda)$ is the coupling efficiency into i,j-th leaky waveguide mode and $\alpha_{i,j}^{W}(\lambda)$ and $\alpha_{i,j}^{LW}(\lambda)$ are loss coefficients of i,j-th waveguide and leaky waveguide modes respectively. The summation should be done over all the modes supported by the given pore structure.

The leaky waveguide mode losses increase very quickly with increase of mode order, while waveguide mode losses do not change much. For both leaky waveguide and waveguide modes, the coupling coefficient $P_{i,j}(\lambda)$ is the highest for the fundamental mode and quickly decreases with increasing mode order.

There are other parameters affecting prior art MPSi filter performance. These include the coupling efficiency of incident light into waveguide or leaky waveguide modes at the first MPSi wafer interface and the out coupling from the waveguide or leaky waveguide modes to transmitted light at the second MPSi wafer interface. If a plane-parallel beam of light is incident on the MPSi interface, the coupling efficiency to the leaky waveguide fundamental mode can be roughly estimated as:

$$P(\lambda) \approx \frac{S}{S_{uc}},$$

where S is the area of pores 1.2 in FIG. 1, while $S_{uc}$ is the area of a MPSi array unit cell (which can be introduced for ordered MPSi arrays only). In other words, to a good approximation, $P_{00}^{LW}(\lambda) \sim p$ in the UV spectral range, where p is the porosity of an MPSi filter near the first MPSi wafer interface. For the waveguide transmission (i.e. for Near IR or IR wavelength ranges), the formula for the coupling efficiency, $P_{00}^{W}(\lambda)$, can also be simplified to:

$$P_{00}^{W}(\lambda) \approx \frac{4 n_{Si}(\lambda) \cdot n_I}{(n_{Si}(\lambda) + n_I)^2} \cdot \frac{S_{uc} - S_p}{S_{uc}},$$

where $n_{Si}(\lambda)$ is the refractive index of silicon at the wavelength $\lambda$ and $n_1$ is the refractive index of the medium from where light is incident on MPSi layer. For the most common case of the latter being air or vacuum, this formula can be rewritten as $$P_{00}^{W}(\lambda) \approx \frac{4 n_{Si}(\lambda)}{(n_{Si}(\lambda) + 1)^2} \cdot \frac{S_{uc} - S_p}{S_{uc}}.$$

In other words, to some approximation, $P_0^{LW}(\lambda) \approx p$ and $P_0^{W}(\lambda) \approx 0.69(1-p)$, where p is porosity of MPSi layer. It should be noted that for the exemplary filter of FIG. 1, the approximation given above for the waveguide case (i.e., for near IR and IR wavelength ranges) is not as good as for the leaky waveguide case (deep UV, UV and VIS spectral ranges) due to strong cross-coupling between neighboring waveguides and due to the presence of the previously described non-waveguiding channel of transmission. This cross-coupling is not taken into account by the approximation set forth above.

At the second interface of the MPSi filter, the light from waveguide ends (leaky or not, as applicable) is emitted with a divergence governed by the numerical aperture, NA, and wavelength. In the far field, the destructive and constructive interference of all light sources in the form of leaky waveguide or waveguide ends takes place. In the case of an ordered MPSi array, this leads to a number of diffraction orders that are defined by the pore array geometry (i.e. by the relationship between pore size, pore-to-pore distance) and the wavelength of the light. For most applications of optical filters, only light outcoupled into the $0^{th}$-diffraction order is of interest. However, some applications are not sensitive to the outcoupling of light to higher diffraction orders. For instance, when the filter is directly mounted on the top of a photodetector or a detector array, only the near field behavior is important. In other cases, the main source of outcoupling losses is the redistribution of light into higher diffraction orders. Such losses are sensitive to both wavelength and pore array geometry. They are more pronounced at short wavelengths due to the higher number of diffraction orders.

It should be noted that outcoupling losses can be completely suppressed for any given wavelength if the MPSi array period is less than or equal to that wavelength. For instance, for a 1550 nm wavelength that is important for optical communications, this will require a pore array period on the order of 1550 nm or less and pore diameters of about 300–1000 nm.

The exemplary prior art spectral filter structure of FIG. 1 cannot be used as a band-pass or narrow band-pass filter in the near IR or IR since the structure of FIG. 1 passes the light above the absorption band of silicon uniformly and does not offer any means to select a band for passing or blocking. In order for it to serve as a band-pass or narrow bandpass filter, some improvements in its design must be made.

Exemplary New Spectral Filter Designs

We provide in one non-limiting illustrative exemplary arrangement, an improved IR filter configuration based on a substantially uniform array of waveguides made of porous semiconductor (where the pores are straight and non-branching). Pore cross sections are either modulated at least along part of their depth while other parts are left unmodulated, or the entire pore depth can be modulated. The pore walls may be covered by at least one layer of transparent material. The pores may be filled or partially coated by a layer of absorptive or reflective material.

Such spectral filters can be used for band-pass, narrow-band pass or band blocking spectral filtering, and provide significant advantages. Exemplary advantages of particular implementations include, but are not limited to: p1 Omnidirectionality, i.e., absence of the spectral shape dependence of transmission (for transmission type optical filters) or reflection (for reflection type optical filters) on the angle of light incidence within the acceptance angles of the filter.

Manufacturability (i.e. ability to fabricate such filters relatively simply and inexpensively compared to the other filter configurations known by those skilled in the art).

The absence of delamination and other structural deficiencies.

Exemplary non-limiting configurations are based on the formation of a large number of identical, mutually decoupled (at least having cross-coupling coefficients small enough that cross-coupling between neighbor waveguides can be neglected) waveguides arranged with respect to each other such that the transmission through the array at the operational wavelengths of such a filter is possible mostly or only through at least one of the waveguide modes of the assembly of waveguides. The transmission and reflection spectra of each of said waveguides is wavelength dependent due to well known Bragg phenomena occurring in the parts of the waveguides that are made to have modulated pore diameters (and through this, modulated waveguide cross-sections). Coherent modulation, meaning periodical modulation with a single period of the waveguide cross sections along the depths of the waveguides can be used. The far-field transmission spectrum of such a spectral filter (and, in the case of pores coated or filled by said reflective or absorptive material, the near field spectrum also) is determined by the transmission spectrum of each leaky waveguide and by the coupling/outcoupling efficiencies at the first and second surfaces of such a spectral filter. In addition, one or both broad faces of the filter made up of waveguide ends separated by pores can be covered by antireflective structure such as, for example, an antireflection layer or an antireflective dielectric multilayer coating. These coatings, covering the broad faces of the non-pore material between the pores that comprises waveguide ends, provide higher coupling and outcoupling efficiencies within the desired spectral band of the filter.

In one exemplary illustrative non-limiting implementation, said waveguide array is formed in a semiconductor wafer in the form of wafer host separated by the channels going through the wafer (pores). Such a structure can be fabricated, for example, by forming a layer of porous semiconductor by means of electrochemical etching of a single crystal semiconductor wafer as deeply as necessary. The un-etched remainder of the wafer may be either subsequently removed or left as a supportive base for the waveguide array. The semiconductor host (in the form of "islands" between the pores), which is transmissive at wavelengths above the band edge of the particular semiconductor material, will serve as waveguides, while the pores formed by such a process will insure a low level of coupling between the waveguides.

The previously mentioned modulation of the cross sections of the waveguides can be achieved through modulating the pore diameters along their depths by modulating the electrochemical etching parameters during electrochemical etching process. For example, the parameters available for modulation include the current density, illumination intensity or others known to those skilled in the art. Said semiconductor material can be silicon (p-type doped or n-type doped), gallium arsenide, indium phosphide, or any other material transparent over some wavelength band, which can be shown to form non-branching pores during electrochemical etching in a suitable electrolyte and under suitable conditions. The covering of the walls of the waveguides can be achieved by partial thermal oxidation of a semiconductor (principally silicon), or by depositing a dielectric single layer or multilayer onto the pore walls by Chemical Vapor Deposition or by any other deposition, sputtering, evaporation or growth process known to those skilled in the art. Covering the substrate or wafer surface (or surfaces) between the pores by an antireflective structure can be accomplished by directional deposition techniques, such as physical vapor deposition, magnetron sputtering, thermal or electron beam evaporation, ion assisted ion plating or any other technique known to those skilled in the art. If the filter structure is too fragile for its intended use (which can be the case if the unetched part of the wafer is removed after the electrochemical process), the porous layer can be reinforced by sealing between two plates of a material that is transparent over the transparency wavelength range of the porous filter. Such plates can be, for instance, of glass, silica, $CaF_2$ or any other transparent dielectric known to those skilled in the art.

In one exemplary non-limiting illustrative implementation, at least one optically transparent layer covering the pore (channel) walls may have a refractive index lower than that of the silicon and may serve as a cladding of said waveguides, designed to substantially minimize cross-coupling between neighboring waveguides and to mechanically reinforce said spectral filter.

In another exemplary non-limiting illustrative implementation, the pores can be disposed across the broad surfaces of the wafer or substrate with a predetermined pattern having predetermined symmetry (for example, cubic or hexagonal). Alternatively, said pores can be disposed at a predetermined pattern that exhibits more complex (advanced) symmetry. The pores may have circular or near-square cross-sections. The pores (and through that the silicon island waveguides) can be made to have tapered ends at the at least one first or second surface of said filter, or to taper uniformly or non-uniformly along their entire lengths. At the narrow end of the taper, the pore lateral cross-section can be gradually decreased when approaching the near surface of the filter substrate in order to increase the coupling and/or outcoupling efficiency to improve the transmittance through the filter. The tapering of the pores in this manner effectively gradually increases the waveguide lateral cross-section In a further exemplary non-limiting illustrative implementation, pores can be filled (partially or completely) by a material that is absorptive or reflective in the transparency wavelength range of the filter configuration to suppress cross-coupling between neighboring waveguides even further. This may increase the propagation losses of the waveguide modes. The use of a transparent pore wall coating as a cladding of silicon waveguides may be used to reduce said propagation losses while keeping cross-coupling suppressed. Said absorptive or reflective material can be metal, metal alloy or any other absorptive or reflective material in the operational spectral band of the filter known to those skilled in the art. Pore filling can be accomplished by electro-plating, electroless plating, chemical vapor deposition, injection molding, dye casting, capillary absorption of a liquid (melted metal) into the pores or by any other method known to those skilled in the art. Removal of excessive material from either one or both surfaces of the spectral filter after the pore filling may be required and can be accomplished through chemical etching, reactive ion etching, chemical-mechanical polishing, mechanical polishing or by any other method known to those skilled in art.

The far IR spectral range can be quite important for many applications such as the nonlimiting examples of astronomy and chemical analyses. Silicon, Ge, III-V compound semiconductors or other materials known to permit ordered pore array formation through electro-chemical etching, however, are not transparent over the whole spectral range of interest. Hence, some modifications of the spectral filter design may be made to serve these applications. According to another exemplary illustrative non-limiting implementation, an improved IR filter configuration based on a substantially uniform array of waveguides is made of free-standing porous semiconductor with straight and non-branching pores. The pore cross sections are either modulated at least along part of the depths while other parts are left unmodulated, or the entire depths can be modulated. The pores are filled with a material that is transparent within the spectral range of interest (nonlimiting examples of such materials include ZnSe, CdTe and thallium iodide). The pore walls may be covered by at least one layer of transparent material that is different from the material filling the pores completely (having a smaller refractive index) prior to said filling of the pores. In this exemplary illustrative implementation, the filled pores will act as waveguides. The material completely filling the pores acts as a waveguide core, while the material covering pore walls (if any) serves as a waveguide cladding. The porous semiconductor matrix can be oxidized before filling the pores to reduce its refractive index and, through that, reduce the cross coupling between neighboring waveguides. Unlike the previously described exemplary illustrative implementation, the ordering of the pore array (and through that of the waveguide array) is not strictly required—only the uniformity of the pore size is needed. However, ordering still can be an advantageous feature.

According to a further exemplary illustrative non-limiting implementation, the first, the second or both surfaces of said filter wafer may be coated with an antireflective structure after said pore filling to suppress coupling and outcoupling losses. Said antireflective coating can be a single layer antireflective coating, or, alternatively, can be made in the form of a multilayer antireflective coating and can be deposited through chemical or physical vapor deposition or by any other technique known to those skilled in the art. Said pore filling can be accomplished by chemical vapor deposition, injection molding, dye casting, capillary absorption of a liquid into the pores or by any other method known to those skilled in the art.

The resulting exemplary non-limiting illustrative filters can have the advantages of stability. They do not exhibit delamination problems and offer remarkable stability over wide range of temperatures and large temperature gradients. They also offer transmittance comparable to that of prior art narrow bandpass, bandpass and band blocking filters combined with the new advantage of omnidirectionality. Omnidirectionality is meant here to be the independence of the spectral position of the reflection band, transmission valley or transmission edge on the angle of light incidence. Such filters are useful for a wide variety of applications, including applications where currently available filter systems cannot provide acceptable performance (e.g., a variety of analytical devices, wavelength division multiplexing, astronomical instrumentation, spectroscopy, and others uses).

BRIEF DESCRIPTION OF THE DRAWINGS

These and other features and advantages provided by exemplary non-limiting illustrative implementations will be better and more completely understood by referring to the following detailed description in connection with the drawings, of which.

DETAILED DESCRIPTION

An exemplary illustrative non-limiting spectral filter comprises a porous semiconductor wafer having pores regularly arranged and coherently modulated throughout at least part of their depths, having at least one layer of optically transparent material optionally covering the pore walls and having an antireflection structure optionally covering the first, second or both broad surfaces of the filter.

Figure 4A:
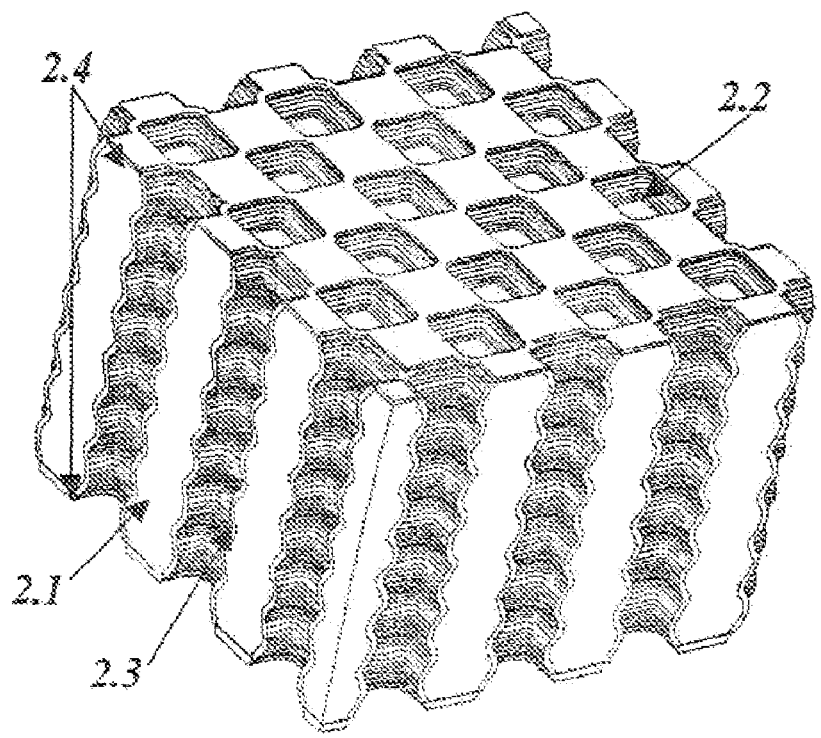
FIG. 4a is a diagrammatic perspective view of a non-limiting, illustrative exemplary implementation of a free-standing uniform pore array section of a uniform cubic lattice and coherently modulated pore cross sections with at least one layer of optically transparent material uniformly covering pore walls and an antireflective coating optionally covering at least one surface of the filter wafer.

A simple non-limiting example of such a filter structure is an MPSi layer, the pore walls of which are covered with just one layer of transparent dielectric. A diagrammatic perspective view of an exemplary illustrative non-limiting spectral filter structure is shown in FIG. 4a. Such a structure includes:

- a semiconductor (e.g., silicon) host 2.1 serving as an array of uncoupled waveguide cores,
- coherently modulated pores 2.2 arranged in a uniform cubic lattice,
- at least one layer of transparent dielectric material 2.3 uniformly covering the pore walls and serving as a waveguide cladding, and
- an antireflective coating on either the first broad surface or both broad surfaces of the filter 2.4 in order to suppress coupling and outcoupling losses.

Layer 2.3 can be of thermally grown or deposited silicon dioxide ($SiO_2$), non-stoichiometric silicon oxide ($SiO_x$), silicon nitride ($Si_3N_4$), a silicon oxynitride or any other material sufficiently transparent at the operational wavelengths of the filter and still having a refractive index considerably less than that of the semiconductor host 2.1. Layer 2.3 and antireflective structure 2.4 can be deposited, grown, sputtered or disposed by any other method known to those skilled in the art.

An example, non-limiting illustrative method to fabricate such a structure is to utilize silicon as the substrate and to uniformly cover all the pore walls with a well-controlled thickness of thermal oxide. This can be accomplished easily by the thermal oxidation of the porous layer at 800–1300° C. This approach is feasible for filters having operating wavelengths in the 1100–2200 nm spectral range. Above that range, silicon dioxide may become absorptive, while below it silicon becomes opaque. For other spectral ranges, different choices of material 2.3 should be considered.

Figure 4B:
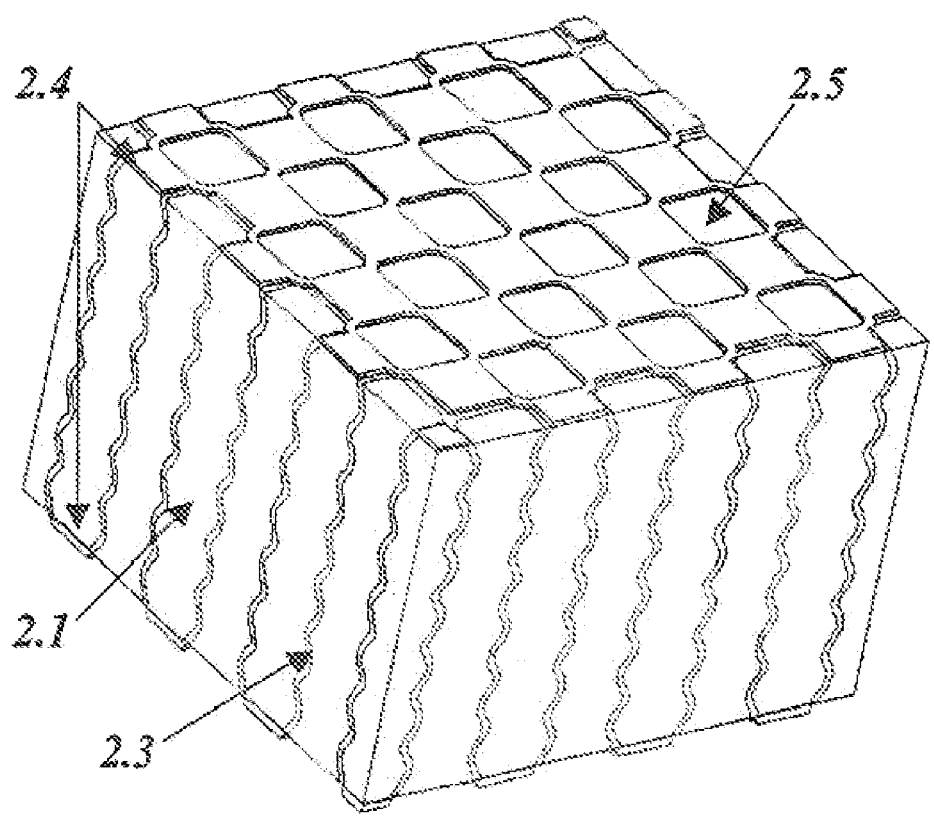
FIG. 4b is a diagrammatic perspective view of a non-limiting, illustrative exemplary implementation of a free-standing uniform pore array section of a uniform cubic lattice coherently modulated pore cross sections with at least one layer of optically transparent material uniformly covering the pore walls, a layer of absorptive or reflective material filling the pores and an antireflective coating optionally covering at least one of the first or second broad surfaces of the filter wafer.

The pores in said semiconductor wafer may be filled with reflective material or absorptive material to suppress the cross-coupling between neighbor waveguides further and to suppress any non-wave-guiding channels of transmission through the filter. A diagrammatic perspective view of such an exemplary illustrative spectral filter structure is shown in FIG. 4b. Such a structure consists of the semiconductor host 2.1, remaining after pore etching, and serving as an array of uncoupled waveguide cores. This structure further incorporates:

- coherently modulated pores (and by extension the coherently modulated remaining host material) arranged in a uniform cubic lattice incorporating a layer of transparent dielectric material 2.3 uniformly covering the pore walls and serving as waveguide cladding,
- a layer of absorptive or reflective material 2.5 at least partially filling the pores and an antireflective coating on either one or both the first and second broad surfaces of the filter 2.4 in order to suppress the coupling and outcoupling losses.

As in the previous example, the layer 2.3 can be of thermally grown or deposited silicon dioxide ($SiO_2$), non-stoichiometric silicon oxide ($SiO_x$), silicon nitride ($Si_3N_4$), a silicon oxynitride or any other material sufficiently transparent in the operational wavelengths of the filter and having a refractive index considerably less than that of semiconductor host 2.1. Layer 2.3 and antireflective structure 2.4 can be deposited, grown, sputtered or disposed by any other method known to those skilled in the art. Filling of the pores with said absorptive or reflective material 2.5 can be accomplished, for example, by chemical vapor deposition, atomic layer deposition, electroplating or electroless plating of a metal or metal alloy through the pores (Ni, Cr, Co, Fe, Cu, Permalloy or any other metal or metal alloy with a well-developed electroplating processes known to those skilled in the art). Alternatively, said filling of the pores can be accomplished, for example, by dipping of porous semiconductor layer into a molten metal or metal alloy at a temperature below both the silicon and the dielectric layer 2.3 alloying or melting points. Other layers of different or the same materials deposited by different or the same methods known by those skilled in the art can be used instead. Said antireflective coating 2.5 is preferentially deposited after the pores have been filled by the absorptive or reflective material and can be accomplished by chemical or physical vapor deposition, spin coating, evaporation or any other technique known to those skilled in the art.

The overall performance of a spectral filter is determined by the particular pore array geometry, pore array symmetry, refractive indices and thicknesses of materials comprising said spectral filter. In other words, performance is determined by the relationship between wavelength of light, pore diameter, pore diameter modulation period and amplitude, pore-to-pore distance, and so on.

Figure 5A:
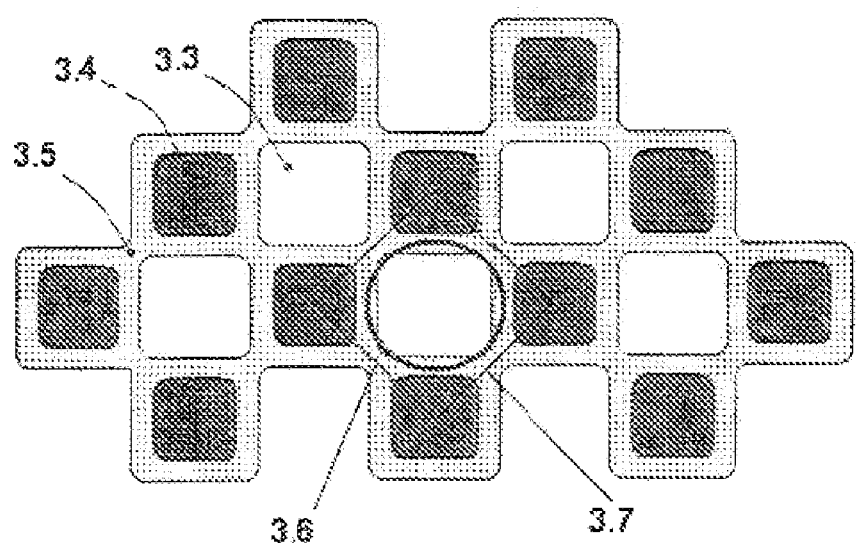
FIG. 5a is a schematic view of an exemplary illustrative uniform pore array cross-section (the pore array arrangement is a uniform cubic lattice with near-square pores, a layer of optically transparent material uniformly covering the pore walls and with the pores optionally filled with absorptive or reflective material).
Figure 5B:
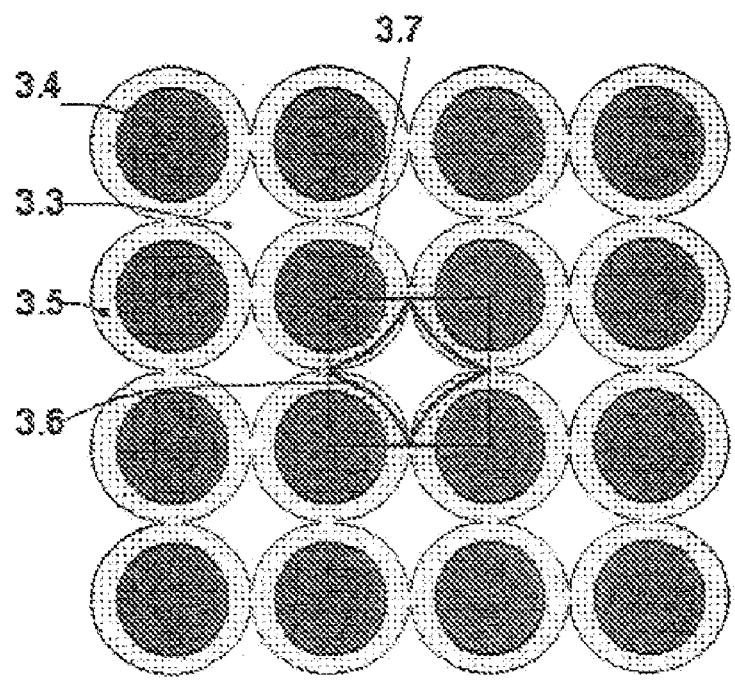
FIG. 5b is a schematic view of an exemplary illustrative uniform pore array cross-section (the pore array arrangement is a uniform cubic lattice with circular pores, a layer of optically transparent material uniformly covering the pore walls and with the pores optionally filled with absorptive or reflective material).
Figure 5C:
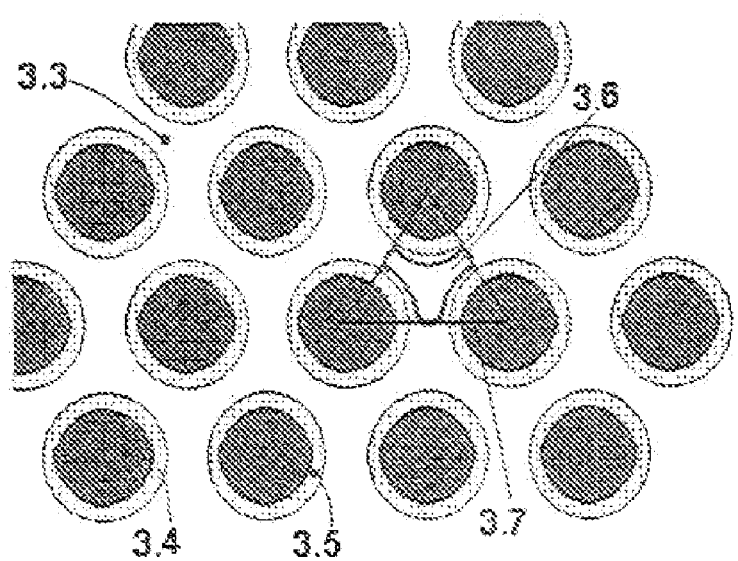
FIG. 5c is a schematic view of an exemplary illustrative uniform pore array cross-section (the pore array arrangement is a uniform hexagonal (close-packed) lattice with circular pores, a layer of optically transparent material uniformly covering the pore walls and with the pores optionally filled with absorptive or reflective material).

As is known to those skilled in the art, the pore array symmetry can vary over quite a wide range for porous semiconductors obtained by electrochemical etching, since said symmetry is to a large extent defined by the symmetry of etch-pits. In other words, the pore starting points in the form of preliminary prepared depressions on the semiconductor surface constrain the etching process and prevent randomly formed pores. Moreover, it is also known to those skilled in the art, that the semiconductor pores can be obtained with different types of cross-sections. For example they can be circular or nearly square. Referring now to FIGS. 5a–5c, different exemplary non-limiting spectral filter cross-sections are shown. Cubic symmetry of pore array made of pores with near-square cross section is schematically shown in FIG. 5a. An illustrative waveguide mode profile 3.6 and a waveguide array unit cell 3.7 are schematically shown. Waveguide modes of each waveguide in the array will be substantially confined in the semiconductor (host) 3.3 due to high refractive index contrast at the silicon 3.3/cladding 3.5 interface, where the cladding is a lower index of refraction transparent material. The waveguide mode area 6 covers at least half of the waveguide array unit cell area 7. Hence, an untapered spectral filter design (tapering of spectral filter will be discussed later) with an antireflective structure coating both surfaces of the filter wafer will provide a coupling efficiency of at least 50% at the first MPSi spectral filter interface.

An exemplary cubic symmetry pore array made of pores having circular cross-section is shown schematically in FIG. 5b. As is illustrated in the figure, the ratio of the waveguide mode area to the unit cell area is lower in this case (assuming the same thickness of cladding layer 3.5 and the same size of semiconductor island 3.3). Hence, the coupling losses are expected to be lower than in the previous example.

An exemplary hexagonal symmetry pore array made of pores having circular cross-section is schematically shown in FIG. 5c. The ratio of waveguide mode area 3.6 to waveguide array unit cell area 3.7 for such a pore array will be considerably less than that for the cubic symmetry MPSi array. Hence, the coupling losses for such a pore array geometry are expected to be considerably higher. Hence, an MPSi array with hexagonal macropore ordering is expected to be disadvantageous for at least many (but not all) applications.

The dimensions of the pore array (pore size and pore-to-pore distance) should be defined by symmetry and operational wavelength range of filter structure. As an illustrative, nonlimiting example, a band-blocking filter having a central blocking-band wavelength of 1550 nm and having the structure shown in FIG. 5a will be considered. It is should be understood that other types of filters for the same or other wavelength ranges can also be used. For this illustrative example, said porous semiconductor is assumed to be porous silicon and said waveguide cladding layer is assumed be silicon dioxide. For most of the applications (but not all), single-mode waveguide transmission is required. For the 1550 nm wavelength, this requirement means that the silicon islands should be less than ~300 nm in cross-section. If no absorptive or reflective material is used to fill the pores, the thickness of the cladding layer (silicon dioxide in this illustrative example) will be defined by just the cross-coupling and mechanical strength considerations and in some cases no cladding layer is needed at all. If an absorptive or reflective layer is used to suppress cross-coupling and transmission in the non-waveguide portions of the filter, the cladding layer is required and its optimal thickness depends also on the losses caused by the introduction of said absorptive or reflective layer.

In one illustrative example, copper was chosen as a reflective layer. For such a filter to have optimized performance, the silicon islands should be approximately 250–280 nm in cross-section, and the pore walls should be covered with silicon dioxide having a thickness preferentially in the range of 200–300 nm. The only missing dimension, the pore-to-pore distance (which is equal to the distance between silicon islands in this illustrative pore array geometry), should be chosen based on the trade-off between cross-coupling between neighbor waveguides (silicon islands) and the maximum obtainable filter transmission (i.e., losses during the coupling and outcoupling at filter interfaces).

Exemplary illustrative spectral filters will exhibit omnidirectional transmission or reflection if cross coupling between neighbor waveguides is absent. However, this does not mean that the cross coupling should be absent completely. Rather, it means that the characteristic coupling length (which is equal to the inverse mode coupling coefficient) should be larger than the waveguide length. In this case, the waveguide length is the length of the coherently modulated part of the waveguide array. Since the porous semiconductor (in this illustrative example, silicon) layer thickness is usually in the 50–450 μm range, the mode-coupling coefficient should be about 180 cm$^{-1}$ (for a 50 μm MPSi layer) to 20 cm$^{-1}$ (for a 300 μm MPSi layer) or less. Such values of cross-coupling coefficient can be achieved if the silicon island separation (or pore-to-pore distance) is more than ~900 nm for the copper-filled pores and more than ~1000 nm for the air-filled pores. The maximum obtainable transmission through such a filter in the absence of tapered ends will be proportional to the ratio of the waveguide mode area to the unit cell area of the pore array, which is equal to the squared pore-to-pore distance (or, which is equivalent, to the silicon island-to-island distance). For a given example of the filter for metal filled pores, this ratio will be ~50% or less and ~40% or less for air filled-pores. If tapered pore ends are used, these number can be increased to ~70% for metal-filled pores and 55% for air filled pores.

The effective refractive index of a semiconductor island waveguide is a function of the waveguide cross-section and through that, the pore cross-section. As the pore cross-section in said spectral filter structure is changed, so is the effective refractive index of each waveguide mode. By creating such a modulation (see FIG. 4), a waveguide Bragg grating in each semiconductor waveguide will be formed. The transmission spectrum of each waveguide will contain a characteristic transmission valley (or reflection peak) at the wavelengths corresponding to the Bragg resonance wavelength $\lambda_B$, which can be determined according to the formula: $\lambda_B = 2n^*\Lambda$, wherein $n^*$ is the effective refractive index of the waveguide mode and $\Lambda$ is the spatial period of pore cross-section modulation. Since all the pores will be grown together during the same process, the modulation will be coherent. Although the transmission and reflection spectral shapes of a spectral filter will in some cases be similar to that of a prior art multilayer interference filter, the transmitted and reflected spectral shapes of such a spectral filter will be independent of the angle of incidence of light on the surface of the spectral filter, which will greatly enhance their technical and economic usefulness over prior art filters that do not exhibit this property.

It is also possible to have the modulation of the pore cross-section in the form of a superimposed grating. A superimposed grating can be reduced to the linear superposition of two or more constant period pore cross sectional modulations along the length of a pore leaky waveguide. Alternatively, modulation of the pore cross-section can be made in the form of periodic modulation with at least one phase shift (or cavity) in it, wherein each of said phase shifts is equal to integer multiple of $\pi$. Spectral filters made according to such a process will exhibit a narrower bandpass transmission shape, while said transmission shape will be independent of the angle of incidence within the acceptance angle range. For an economically feasible quality of narrow band pass filter, a low level of losses around the wavelength $\lambda_B$ is desirable.

According to further aspects of non-limiting illustrative exemplary implementation, the spectral filters have pores with adiabatically tapered channel cross-sections near the first and/or second surfaces of the spectral filter substrate wafer. Tapered ends provide a gradual increase of pore cross section from the value of the pore cross-section at the surface of the spectral filter wafer to the value of the pore cross-section inside the spectral filter wafer and through that, a gradual decrease of waveguide cross section from the value of the waveguide cross-section at the surface of the spectral filter wafer to the value of the waveguide cross-section inside the spectral filter wafer). The term "adiabatically" means that the rate of change of waveguide cross-section with the depth is slow (the angle produced by the pore surface inside the tapered portion of the pore with the normal direction to the said spectral filter surface does not exceed 45°, and is preferably 10° or less). Such a tapering of waveguide ends can suppress by up to an order of magnitude the coupling and/or outcoupling losses of said spectral filter, while keeping the spectral filter mechanically robust and cross-coupling between neighbor waveguides at a low level sufficient for omnidirectional performance.

Although the mechanism of improving the performance of spectral filters as disclosed herein is interference-based, such a spectral filter will not generally suffer from the typical disadvantages of prior art interference filters, such as the dependence of the filter Bragg feature position, reflection and transmission edge sharpness, reflection and transmission efficiency and width of the reflection and/or transmission bands on the angle of incidence of the light (under the assumption that non-waveguide channels of transmission are suppressed or if the measurements are done in the far field of the filter). Such disadvantages are avoided for example because the light-to-filter coupling and outcoupling processes are independent of the filtering mechanism. Dependence of the transmission magnitude on the angle of incidence will be closer to that of absorption-based filters (e.g., Schott glass filters, colored glass filters, etc.) and will gradually decrease when the angle of incidence deviates from the normal direction within the acceptance angle of the spectral filter, while the spectral shape of the transmission spectrum will not change.

FIG. 6 shows exemplary non-limiting illustrative plots comparing the numerically calculated transmission spectra through a prior art narrow bandpass filter and the spectral filter based for example on the FIG. 4a design for different angles of incidence of a plane wave beam and different convergences (or divergences) of the incident beam. FIG. 6a shows the illustrative exemplarily numerically calculated transmittance spectra through an interference-type seven-cavity narrow bandpass filter for normally incident, 10°- and 15°-tilted plane parallel beams. The wavelength shift of the pass-band edge position, common to all interference filters, and the degradation of the pass-band shape common to all multiple cavities interference filters, is demonstrated. FIG. 6b presents an illustrative exemplary non-limiting normalized transmittance spectra through a spectral filter based on the FIG. 4a design with a 7 cavity structure (similar in structure to that illustrated in FIG. 4) for normally incident, 20°- and 30°-tilted plane parallel beams. As follows from FIGS. 6a and 6b, spectral filters of the type shown in FIG. 4a provide significant advantages over prior art filters and will provide the opportunity for using narrow bandpass, band-pass or band-blocking filters at different angles of incidence (±40° at least). This attribute will greatly decrease the criticality of optical alignment and provide other economic advantages.

Figure 6A:
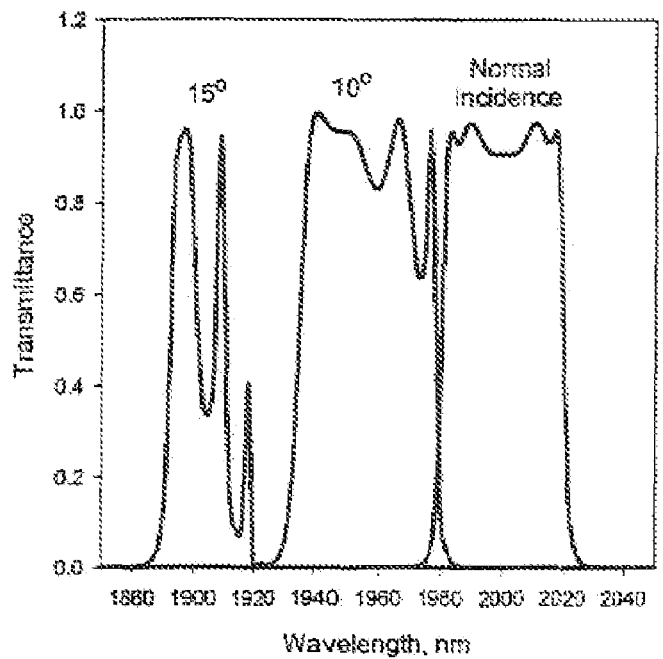
FIG. 6a is an exemplary illustrative plot of numerically calculated transmission spectra of a prior art, seven cavity, narrow band-pass filter for different angles of light incidence.
Figure 6B:
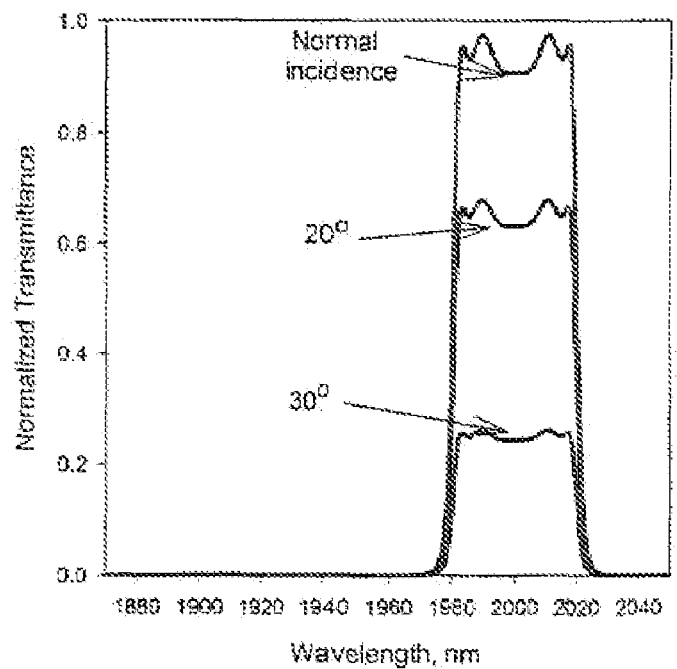
FIG. 6b is an exemplary illustrative plot of numerically calculated transmission spectra of a new, seven cavity, narrow band-pass filter disclosed herein for different angles of light incidence.
Figure 6C:
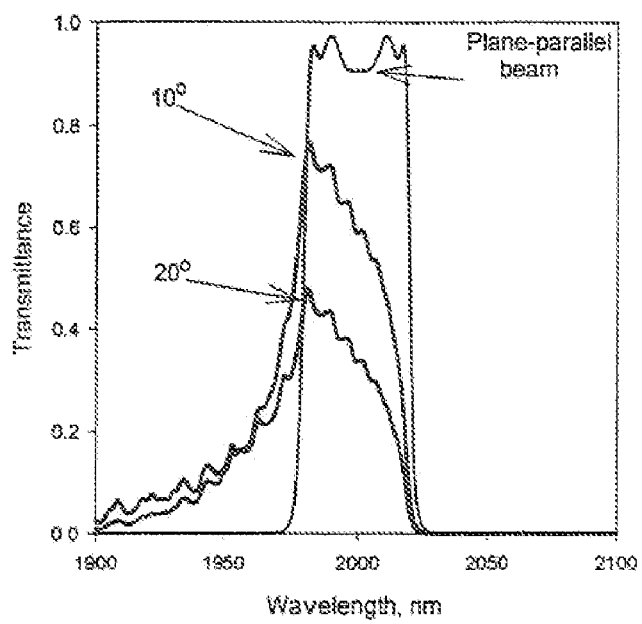
FIG. 6c is an exemplary illustrative plot of numerically calculated transmission spectra of a prior art, seven cavity, narrow band-pass filter for different divergences of an incident Gaussian beam.
Figure 6D:
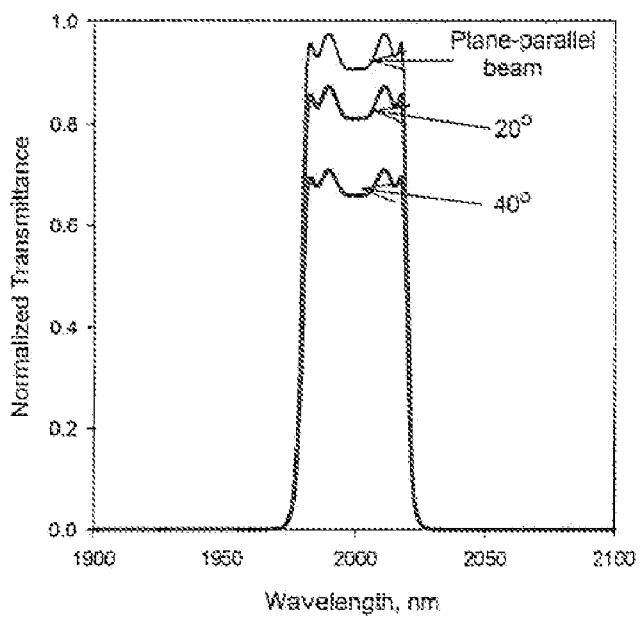
FIG. 6d is an exemplary illustrative plot of numerically calculated transmission spectra of a new, seven cavity, narrow band-pass filter disclosed herein for different divergences of an incident Gaussian beam.

FIG. 6c gives illustrative exemplarily plots of numerically calculated transmittance spectra through a prior art, seven-cavity, narrow bandpass interference filter of FIG. 6a for normally incident beams with different convergences: A plane-parallel beam (0-covergence angle), and Gaussian beams with 10° and 20° convergence angles are represented. The degradation of both the band-edge shape and out-of-band rejection, common to prior art, interference-type, multiple-cavity, narrow bandpass filters, is demonstrated. FIG. 6d presents illustrative exemplarily plots of normalized transmittance spectra through the spectral filter based on the FIG. 4a exemplary implementation for 0°, 20° and 40° convergent, normally incident Gaussian beams. It follows from FIG. 6 that the spectral filter of FIG. 4a will provide the opportunity to utilize narrow bandpass, band pass and band blocking filters in convergent or divergent beams to at least convergence or divergence angles of ±40°.

Figure 1:
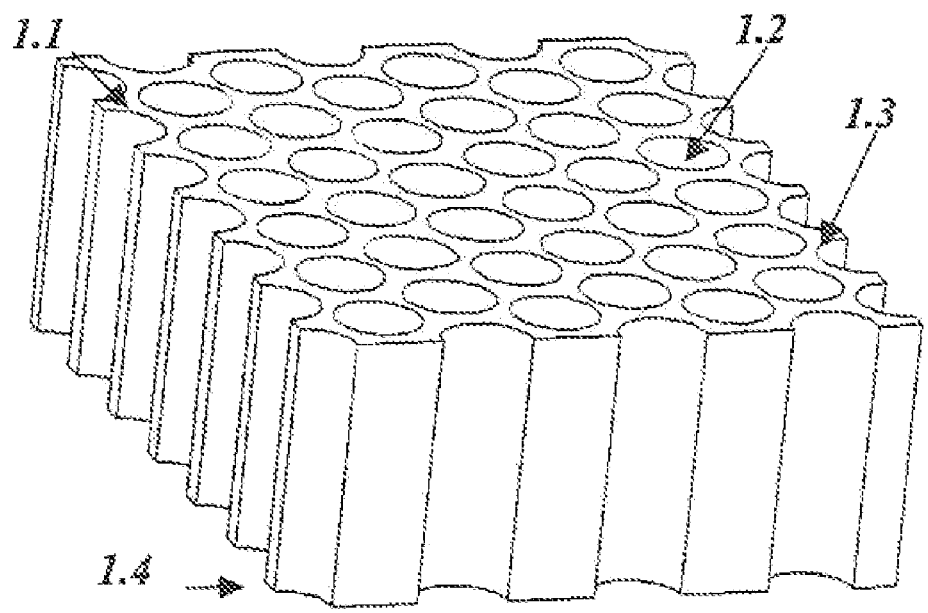
FIG. 1 is a diagrammatic perspective view of an example prior art free-standing Macroporous Silicon array of pores forming a uniform (coherent) hexagonal lattice.
Figure 2:
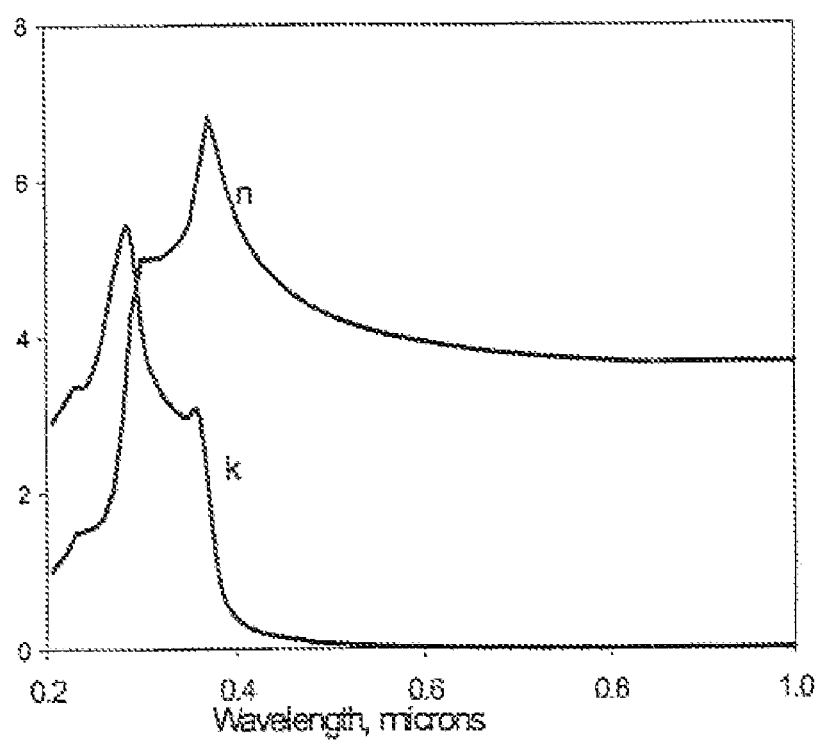
FIG. 2 is an example illustrative plot of the wavelength dependence of the real and imaginary parts of the complex refractive index of silicon in the deep UV, UV, visible and near infrared wavelength ranges.
Figure 3:
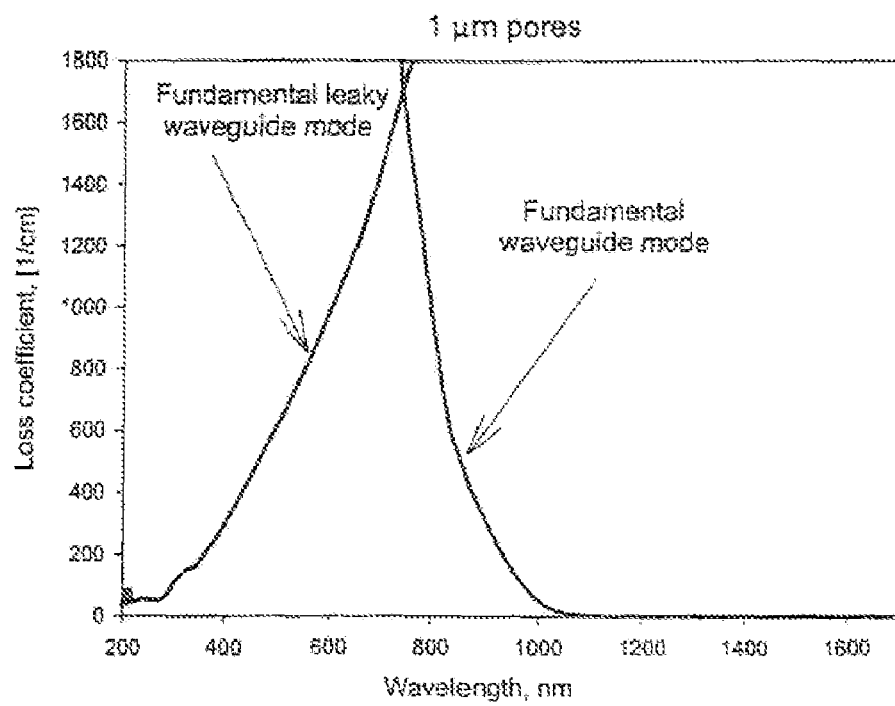
FIG. 3 is an illustrative plot of a numerically calculated spectral dependence of optical loss coefficients for a fundamental leaky waveguide and waveguide modes for the prior art MPSi filter of FIG. 1 (having 1 μm square pores).

The disclosed above exemplary non-limiting spectral filter designs have significant advantages over prior art spectral filters. However, the FIG. 4a designs generally cannot be directly transferred into the visible and near IR spectral ranges (400–1100 nm wavelength) due to the absorption of the silicon (see FIG. 2). Visible and near IR spectral ranges are of great commercial importance and omnidirectional narrowband pass, band pass or band blocking spectral filters are clearly needed for these wavelengths.

According to a further exemplary non-limiting implementation, narrow bandpass, bandpass or band blocking spectral filters functional in the 400–2500 nm spectral range can be made by complete thermal oxidation of the free standing porous semiconductor (e.g., silicon) array having coherently modulated pore diameters, covering the pore walls by a transparent material with refractive index lower than that of the semiconductor thermal oxide (for example, $CaF_2$) and optionally filling the pores at least partially with reflective or absorptive material. For such an exemplary spectral filter design, the thermally grown silicon dioxide will serve as the waveguide core, while the layer of low refractive index dielectric uniformly covering the pore walls will serve as a waveguide cladding. Hence, similar to the exemplary spectral filters described above, the oxidized MPSi host could serve as an array of independent waveguides.

Figure 7:
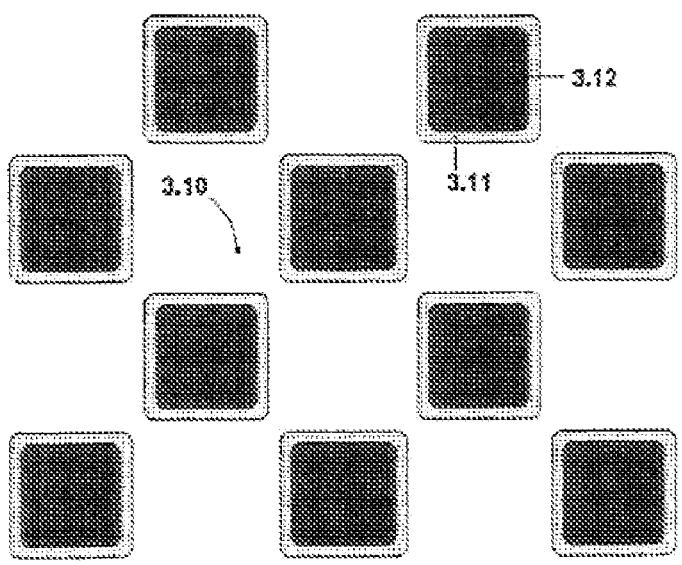
FIG. 7 is an exemplary schematic cross-sectional view of an exemplary, non-limiting illustrative free-standing, completely oxidized MPSi array of uniform cubic lattice with near-square pores, with the pores filled with reflective material.

Referring now to FIG. 7, an exemplary cross-sectional view of a non-limiting exemplary illustrative spectral filter is schematically shown. The thermally oxidized Si host 3.10 is coated by the layer of low index dielectric 3.11 and the pores are then filled by the layer of absorptive and/or reflective material 3.12. The overall performance of such a spectral filter will be determined by the particular pore array geometry (i.e., by the relationship between the wavelength of light, pore cross-section, pore diameter modulation, pore-to-pore distance, etc.), the pore array symmetry, the refractive indices of the pore-filling material, the thermally oxidized silicon host and the transparent layer covering the pore walls. The cubic symmetry of the thermally oxidized silicon pore array is advantageous compared to the hexagonal symmetry from the viewpoint of minimizing the coupling and outcoupling losses at the spectral filter interfaces. The dimensions of the pore array may be different than as described above since the waveguiding parameters are different.

In another exemplary illustrative non-limiting implementation, an improved narrow bandpass, bandpass and/or band blocking filter configuration is based on a substantially uniform array of waveguides made of a free-standing porous semiconductor (where the pores are straight and non-branching). The pore cross sections can be modulated at least along part of their depths while other parts are left unmodulated, or the entire depths can be modulated. The pores are filled with a material that is transparent within the spectral range of interest (nonlimiting examples of such materials include ZnSe, CdTe and thallium iodide). The pore walls may be covered by at least one layer of transparent material different and having smaller refractive index from that chosen to fill the pores completely prior to said filling of the pores.

Figure 8:
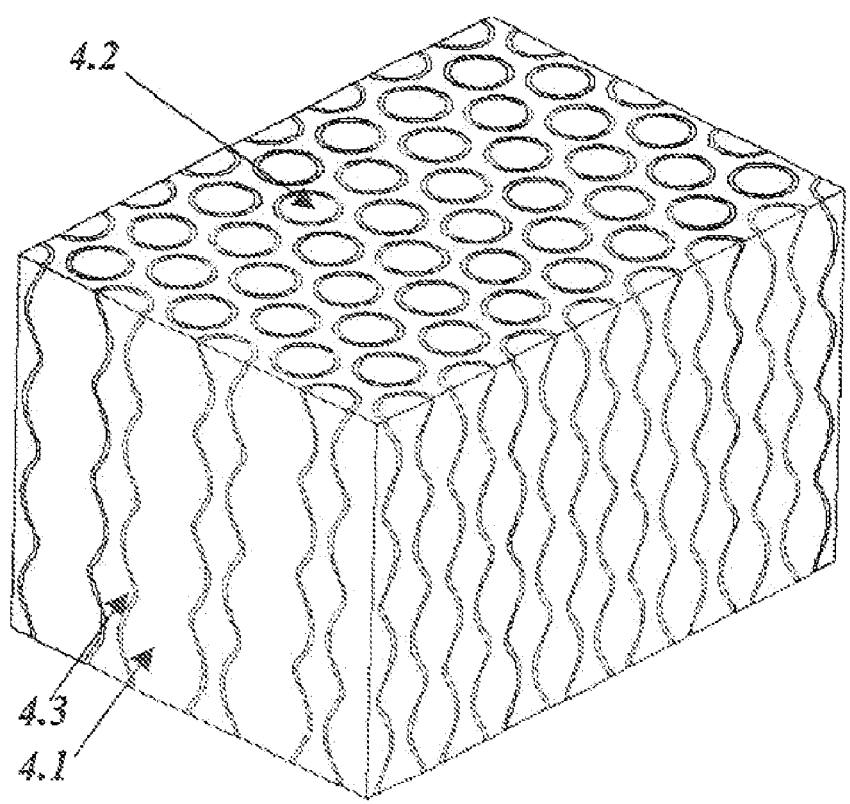
FIG. 8 is a diagrammatic view of an exemplary, non-limiting illustrative free-standing porous semiconductor array of uniform cubic lattice and coherently modulated pore cross sections with circular pores, the pores being filled with transparent material.

FIG. 8 shows an exemplary diagrammatic view of an exemplary, non-limiting illustrative free-standing porous semiconductor array of uniform cubic lattice with circular pores. The pores 4.2 in this case are filled with transparent material and will act as a waveguides. The material completely filling the pores 4.2 acts as a waveguide core, while the material covering the pore walls (if any) 4.3 serves as a waveguide cladding. The porous semiconductor matrix may be oxidized prior to said pore filling in order to reduce its refractive index and through that reduce the cross coupling between neighbor waveguides. The ordering of the pore array (and through that of the waveguide array) is not strictly required. Only the uniformity of the pore sizes is required. However, ordering still may be an advantageous feature.

The first, the second or both surfaces of said filter wafer may be coated with antireflective structure (not shown in FIG. 8) after said pore filling to suppress coupling and outcoupling losses. Said antireflective coating can be a single layer antireflective coating, or, alternatively, can be made in the form of a multilayer antireflective coating and can be deposited through chemical or physical vapor deposition or by any other technique known to those skilled in the art. Said pore filling can be accomplished by chemical vapor deposition, injection molding, dye casting, capillary absorption of a liquid into the pores or by any other method known to those skilled in the art.

Figure 9A:
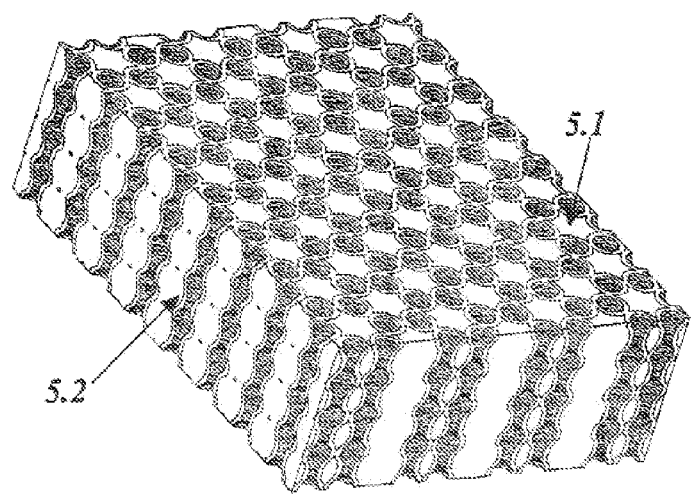
FIG. 9a is a diagrammatic perspective view of a non-limiting, illustrative exemplary implementation of a free-standing uniform pore array section of an advanced-symmetry hexagonal lattice with at least one layer of optically transparent material uniformly covering the pore walls.

For the disclosed above exemplary spectral filter embodiments, simple symmetry (cubic or hexagonal) pore arrays were considered. However, to maximize the transmission (or to minimize the coupling or outcoupling losses), more complex pore arrays may be used. Examples of such a pore array cross-sections are given in FIGS. 9 and 10. FIG. 9a shows an advanced hexagonal symmetry pore array comprising circular coherently modulated pores arranged into an advanced hexagonal symmetry pattern with pore walls coated by at least one layer of transparent dielectric material. Semiconductor islands 5.1 between the pores serve in such an embodiment as waveguide cores, while the optional pore coating structure 5.2 serves as a waveguide cladding. The principle of operation (i.e., the transmission and filtering mechanisms) is generally the same for this structure as for the structures described above. Such a spectral filter would exhibit either narrow bandpass, bandpass and/or band blocking transmission or reflection spectral characteristics combined with the omnidirectionality in the sense as described previously. If stronger cross-coupling suppression is desired for such an advanced symmetry pore array or if further suppression of the non-waveguide channel of transmission is needed, the pores can be filled by absorptive and/or reflective material at least partially.

Figure 9B:
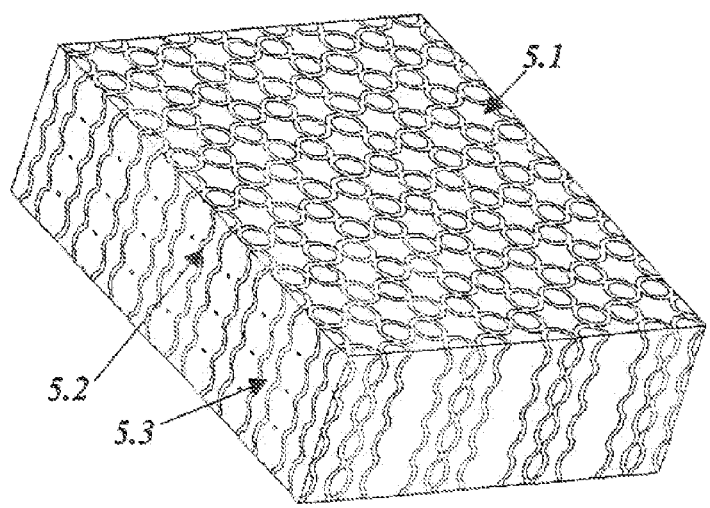
FIG. 9b is a diagrammatic perspective view of a non-limiting, illustrative exemplary implementation of a free-standing uniform pore array section of an advanced symmetry hexagonal lattice with at least one layer of optically transparent material uniformly covering the pore walls and a layer of absorptive or reflective material filling the pores.

FIG. 9b shows an advanced symmetry hexagonal symmetry pore array comprising circular coherently modulated pores arranged into an advanced hexagonal symmetry pattern with pore walls coated by at least one layer of transparent dielectric material 5.2 and pores at least partially filled with absorptive or reflective material 5.3.

Figure 9C:
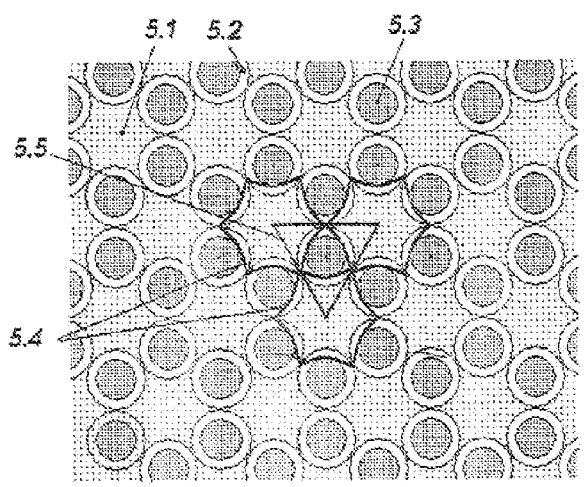
FIG. 9c is a cross-sectional schematic view of an exemplary, illustrative non-limiting uniform pore array of an advanced symmetry hexagonal lattice with circular pores, with a layer of optically transparent material uniformly covering the pore walls and with the pores optionally filled with an absorptive or reflective material.

FIG. 9c shows a cross-sectional schematic view of the same pore array as that of FIG. 9b. The semiconductor waveguide mode profile 5.4 and pore array unit cell 5.5 are schematically shown. It is illustrated that for the porous semiconductor filter of FIG. 9, the ratio of the waveguide mode to pore array unit cell is considerably higher than those of pore arrays having simple symmetries (as in FIGS. 4, 5 and 7).

Figure 10A:
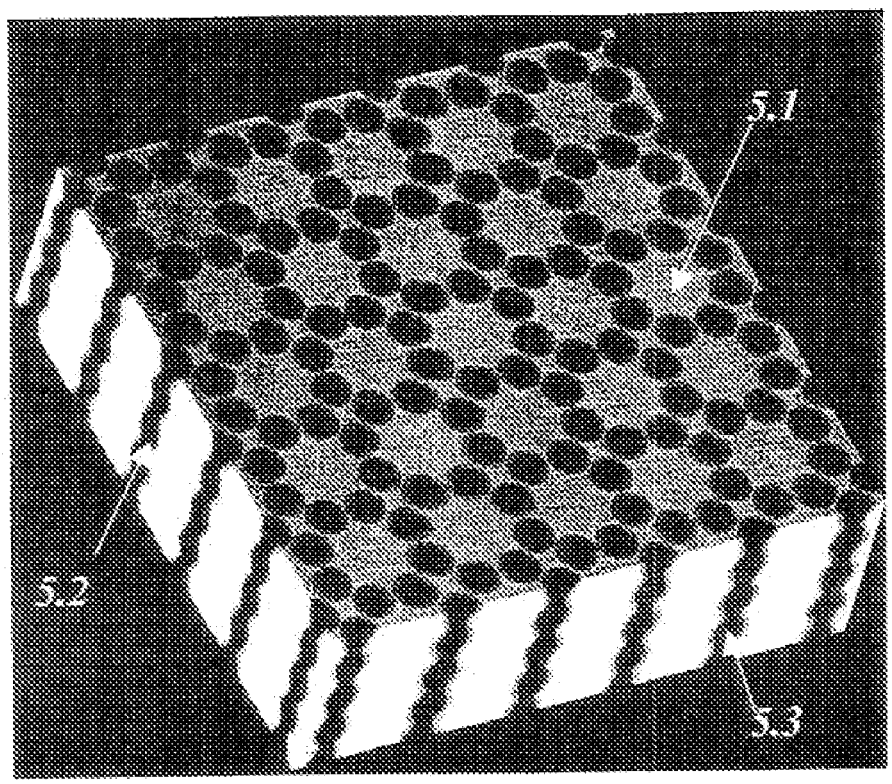
FIG. 10a is a diagrammatic perspective view of a non-limiting, illustrative exemplary implementation of a free-standing uniform pore array section of an advanced symmetry cubic lattice with at least one layer of optically transparent material uniformly covering the pore walls and, optionally, a layer of absorptive or reflective material at least partially filling the pores.
Figure 10B:
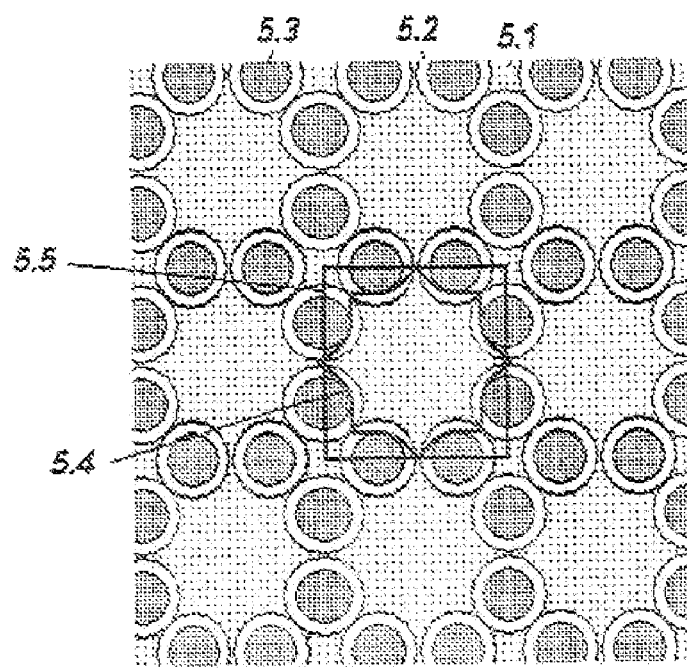
FIG. 10b is a cross-sectional schematic view of an exemplary, illustrative non-limiting uniform advanced symmetry cubic pore array with circular pores, a layer of optically transparent material uniformly covering the pore walls and with the pores optionally filled with an absorptive or reflective material.

FIG. 10a shows an advanced cubic symmetry pore array comprising circular coherently modulated pores arranged into an advanced cubic symmetry pattern with pore walls coated by at least one layer of transparent dielectric material and, optionally, pores at least partially filled with absorptive or reflective material. FIG. 10b shows a cross-sectional schematic view of the same pore array as that of FIG. 10a. The semiconductor waveguide mode profile 5.4 and pore array unit cell 5.5 are schematically shown. For the porous semiconductor filter of FIG. 10, the ratio of waveguide mode to pore array unit cell is considerably higher than those of pore arrays having simple symmetries (as in FIGS. 4, 5 and 7) and higher than that of the advanced hexagonal symmetry (as in FIG. 9). The first, second or both broad surfaces of a porous semiconductor layer may be coated by an antireflection coating to suppress coupling and/or outcoupling losses. The porous layer also can be left attached and mechanically supported by the non-porous remainder of the semiconductor wafer, or, alternatively, may be made freestanding by removing said non-porous remainder of the semiconductor wafer. The waveguide ends at the first, second or both surfaces of said porous layer can be made to have taper to increase the mode area around the first, the second or both surfaces of the porous layer in order to suppress coupling and/or outcoupling losses.

As an illustrative example of the advantages offered by the advanced symmetry pore arrays, the exemplary case of an MPSi layer having the structure of FIG. 9a will be considered in relation to spectral filtering in the optical communication band at 1550 nm wavelength. As was mentioned previously, for such a wavelength the cross-section of the silicon islands should be less than 300 nm in order to satisfy a single-mode requirement. The sizes of the pores and the thickness of the silicon dioxide layer covering the pore walls should be specified according to cross-coupling suppression requirements. In taking the silicon dioxide thickness to be half of the pore radius, the numerical calculations show that the cross-coupling coefficient between neighbor silicon island waveguides reaches acceptable levels at a silicon island separation of 790 nm, which corresponds to a pore diameter of about 180 nm and a silicon dioxide layer thickness of at least 45 nm in this particular exemplary embodiment. The unit cell area for such an MPSi layer is 0.26 $\mu m^2$, while the waveguide mode area is around 0.2 $\mu m^2$. Hence the coupling losses at the first surface of an MPSi layer will be about 25% if the antireflection structure is deposited on the first surface. Tapering of the pore ends (thus the waveguide ends) can suppress coupling losses to less that 15–18%. In the illustrative example of the MPSi layer having the structure of FIG. 9b with Cu-filled MPSi and an $SiO_2$ layer covering the pore walls, the ratio of waveguide mode area to unit cell area can be further increased due to higher suppression of the cross-coupling losses. For such arrays, the potential transmittance will exceed 85%, which is suitable for most applications of IR narrowband-pass, band-pass or band-blocking filters.

Advanced symmetry porous semiconductor oxide structures may be used as functional omnidirectional narrow bandpass, bandpass and band blocking filters in the visible range (where most semiconductors are absorptive). Such exemplary spectral filter structures may consist of a freestanding advanced symmetry pore array having coherently modulated pore diameters in a completely thermally oxidized semiconductor (e.g., silicon) with pore walls covered by at least one layer of transparent material with refractive index lower than said semiconductor oxide and pores optionally filled with an absorptive or reflective material. In such a filter structure, the semiconductor oxide islands will serve as waveguide cores, while said at least one layer of transparent low refractive index material (e.g., magnesium fluoride) will serve as a waveguide cladding.

Exemplary Fabrication Techniques

The spectral filters described herein can be manufactured by various techniques. Since such filters necessarily contain huge numbers of through-pores, the most appropriate methods should, in some applications, provide the fabrication of all the pores comprising one filter (or group of filters on a host wafer) during one process. Several processes are well known in the art to provide pore arrays. These include but are not limited to, anodic etching of semiconductors (Si, InP, GaAs, Ge, etc).

One illustrative, non-limiting exemplary method of fabricating the spectral filters herein is based on anodic etching of silicon. A non-limiting illustrative exemplary method of manufacturing spectral filters can be better understood from FIG. 11. FIGS. 11a–11j show exemplary intermediate steps of such processes. According to one illustrative non-limiting exemplary process, a host wafer, or substrate 11 (see FIG. 11a) of n-doped, single-crystal (100) oriented silicon having an electrical conductivity of, for example, 0.5 to 5 $\Omega$*cm is provided. Wafer 11 has a first surface covered with the layer 12 having thickness from 5 to 500 nm, which can be, for example $SiO_2$ or $Si_3N_4$, thermally grown, sputtered, or deposited by CVD or any technique known to those skilled in the art for use as a masking material. Many masking materials and deposition methods can be used, as known to those skilled in the art.

Figure 11A:
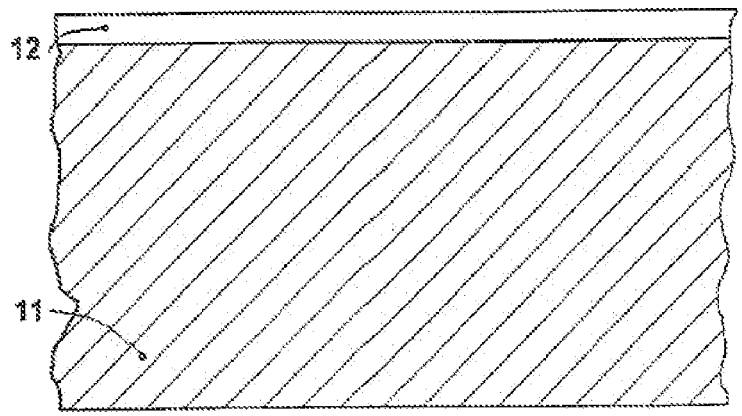
FIG. 11a–11j are illustrative nonlimiting schematic cross-sectional views illustrating exemplary non-limiting steps for fabricating an exemplary illustrative non-limiting implementation of a spectral filter.
Figure 11B:
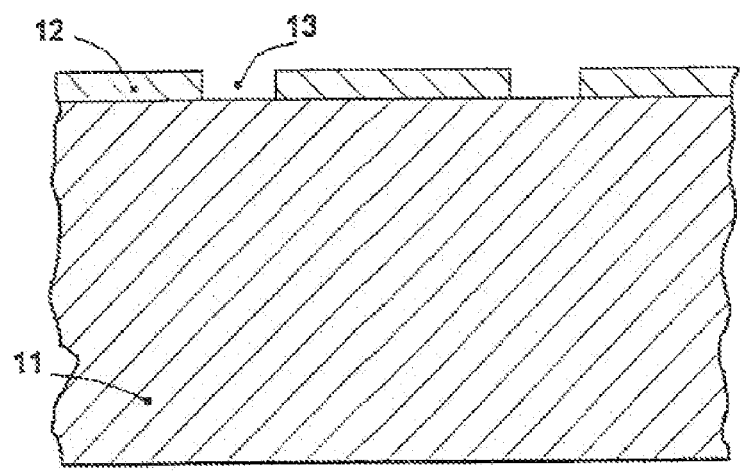

Referring now to FIG. 11b, an etching mask to protect the broad surface of the host wafer during subsequent etch pit formation as is produced in the layer 12 in the form of cutouts 13. Such cutouts are usually made completely through the masking material as in the positions desired for the pores. The pattern for the pores can be arranged regular intervals, which may include orthogonal rows and columns, a hexagonal or other repeating pattern (such as an advanced hexagonal or cubic symmetry patterns in FIGS. 9 and 10). Such a pattern is termed "coherent" or "ordered". Cutouts 13, for example, are produced with a photoresist mask with the assistance of known photolithographic methods and subsequent etching of layer 13 through said photoresist mask. The employed etching technique can be wet chemical etching, Reactive Ion Etching, Ion Milling or any other appropriate kind of etching known to those skilled in the art. Alternatively, layer 12, with features 13, can be deposited by a photolithographic lift-off process. By another alternative method, layer 12 can be the photoresist layer itself and the features 13 can be formed by an ordinary photolithographic process if the photoresist will withstand the etch pit formation. Another illustrative method would comprise the application of the masking layers with features 13 by the method of micro- or nano-replication or stamping.

Figure 11C:
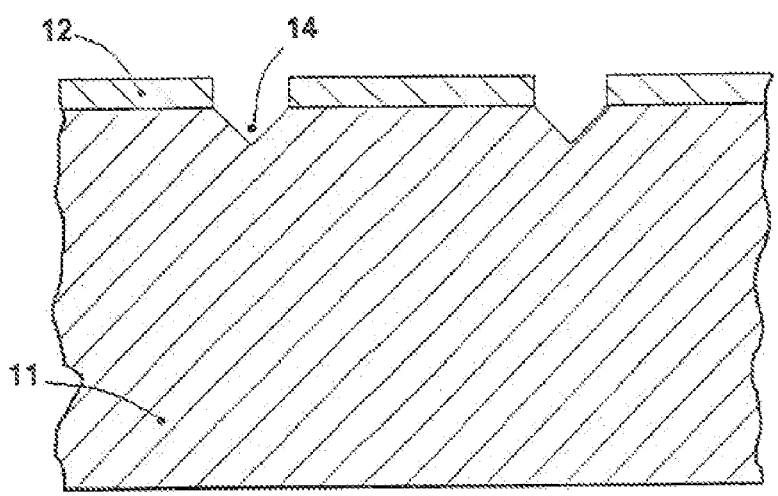

Referring now to FIG. 11c, features 13 in the etching mask layer 12 are transformed into the depressions 14 in the surface of the Si wafer 11 by means of an etching step. The transformation of the surface topology from layer 12 to the first surface of silicon wafer 11 can be done by alkaline etching, acidic etching, Reactive Ion Etching, Ion milling or any other etching technique known to those skilled in the art. Although in general the depressions 14 do not have to be of the inverse pyramidal shape shown in FIG. 11c, this is the most energetically favorable shape for pore etching. Pyramidal or other shaped depressions can be produced by anisotropic wet chemical etching of Si using such etchants as TMAH (Tetra Methyl Ammonium Hydroxide) or KOH. The pyramidal shape is additionally preferred due to the possibility of controlling the pore positions within the depressions with the spatial precision of a few nanometers. Alternatively, surface topology 14 can be formed by light-induced electrochemical etching with an electrolyte and an illumination pattern being produced on the first surface upon employment of a light source having a wavelength less than 1100 nm. The current density in the electrolyte is set such that the anodic minority carrier current locally flows across the substrate wafer only at the illuminated locations of the illuminated pattern to create an etching erosion of the first surface at these locations to form the depressions 14. It should be noted that this last method may be effective only on relatively thin (t<100 microns) silicon wafers if the pore-to-pore distances in the spectral filter have to be maintained below 10 microns.

Figure 11D:
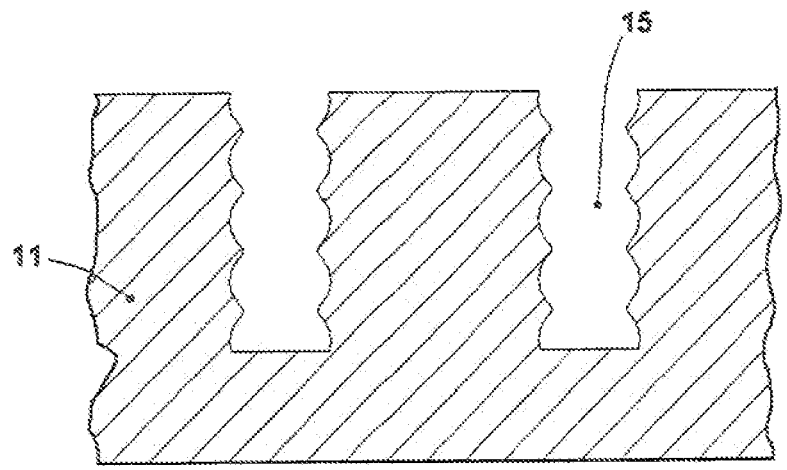

Referring now to FIG. 11d, the first surface (with depressions 14) of the substrate 11 is brought into contact with a fluoride-containing, acidic electrolyte. The electrolyte has a hydrofluoric acid concentration in the range of 0.5% to 50%, and preferably in the range of 2–8%. An oxidizing agent, for example hydrogen peroxide, to increase the rate of the anodization process and a surfactant can be added to the electrolyte in order to suppress the development of hydrogen bubbles on the first surface of the substrate 11 during the etching process. Alternatively, the electrolyte can additionally contain a hydrogen reducing agent chosen from the group of chemicals consisting of mono-functional alkyl alcohols, or tri-functional alkyl alcohols such as ethanol, for example. A viscosity increasing agent, for example, glycerol, can be added to the electrolyte in order to promote better quality of the macropores.

The substrate wafer 11 is then connected to an electrical circuit as the anode. A voltage in a range of 0 volts through 200 volts (preferably 0.5 to 10 volts) is applied between the substrate wafer 11 and the electrolyte. The substrate wafer 11 is illuminated with a light on from the backside of the wafer 11 so that a current density of, for example, 10 $mA/cm^2$, is set or obtained. In general, the current density is preferably set within the range of 4 $mA/cm^2$ through 20 $mA/cm^2$. Proceeding from the depressions 14 of FIG. 14c, pores 15 will be formed to extend perpendicularly relative to the first surface of the host wafer 11. The holes 15, also known as macropores, are produced by electrochemical etching. A macroporous layer is thus formed in the host wafer 11 starting from the first surface. In order to obtain coherently modulated macropores along at least some part of the porous layer formed through the electrochemical process, at least one of the electrochemical process parameters (applied voltage, applied current or illumination intensity) should be time-modulated during some time span during the anodization process. In one exemplary implementation, said time-modulated parameter is applied voltage and the modulation is periodical or near periodical with the period in the range of 5 s to 1000 s and the amplitude being in the range of 10% to 100% of the maximum value of the applied voltage. The illumination is kept constant in such method. The applied current density will have the same modulation period as the applied voltage but a different amplitude of modulation due to the generally nonlinear IV curve of the silicon/electrolyte system. According to another illustrative arrangement, the applied voltage is kept constant in a range of 0 volts through 100 volts, while the illumination intensity is time-modulated, said modulation being periodical or near-periodical with the period in the range of 5 to 1000 s and the amplitude in the range of 10% to 70% of the maximum value of the light intensity. According to still another illustrative embodiment, one of the parameters (e.g., illumination intensity) is time modulated, said modulation being periodical or near-periodical, while at least one other parameter (such as the temperature of the electrolyte) is changed in a slow, predetermined fashion. Alternatively, more than one parameter may be modulated with the same or different time periods (such as amplitude, period, etc.).

Alternatively, substrate wafer 11 can be of p-doped, single-crystal (100) oriented silicon having an electrical conductivity of, for example, 1 to 200 $\Omega$*cm. The steps of producing the depressions 14 on the first surface of wafer 11 are the same as for the n-type Si wafer case discussed above. The difference will be an electrolyte composition that should necessarily contain organic additives to promote macropore formation during the electrochemical etching process. For the case of an electrical conductivity in the range of 1 to 10 $\Omega$*cm for the p-doped Si wafer 11, the electrolyte may contain a hydrofluoric acid concentration in the range of 0.5% to 50%, and preferably in the range of 1–8%, and dimethylformamide (DMF) with a concentration in the range of 10 to 98%, and preferably in the range of 40 to 98%. For the case with the electrical conductivity in the range of 10 to 100 $\Omega$*cm for the p-doped Si wafer 11, the electrolyte may contain a hydrofluoric acid concentration in the range of 0.5% to 50%, and preferably in the range of 1–8%. It may also contain acetonitrile (MeCN), diemethyl sulfoxide (DMSO) or DMF with a concentration in the range of 10 to 98%, and preferably in the range of 40 to 98%. Other organic additives known to those skilled in the art that can serve as macropore promoters can be used instead of DMF, DMSO or MeCN, or in combination. In addition to said macropore-promoting organic additives, the electrolyte can contain oxidation, hydrogen removing, wetting, viscosity and conductivity modifying agents similar in function to those taught above for the n-type Si case.

In both exemplary non-limiting illustrative arrangements above, the electrochemical etching can be performed during the time required to form a macroporous layer with a thickness predetermined by the specific spectral filter design considerations. This time can be found through calibration runs.

According to another exemplary non-limiting illustrative arrangement, the electrochemical etching process parameters (such as, for example, current density or backside illumination intensity) can be changed during the etching run such that tapered pore ends are formed on both the first surface of Si wafer hand near the deep ends of the pores. This can be accomplished by, for example, setting an initial current density of 3 mA/cm$^2$, linearly changing it to 8 mA/cm$^2$ during first 20 minutes of the etching process, setting the process parameters to obtain pores with needed depth and profile, and then linearly changing the current density down to 3 mA/cm$^2$ during the last 20 minutes. The examples given herein do not preclude other changes of electrochemical parameters. After the electrochemical etching process is complete, the Si wafer having macropores 15 is removed from the electrochemical etching apparatus. The wafer should be carefully cleaned to insure the electrolyte is removed from the deep macropores.

Figure 11E:
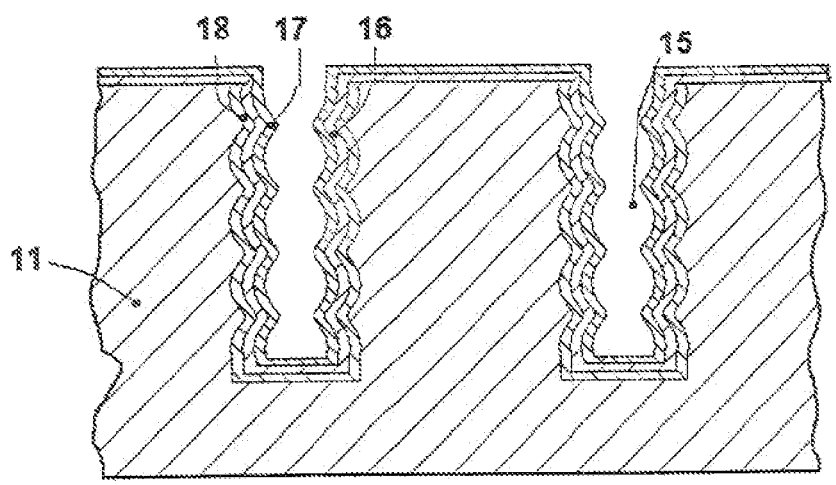

Referring now to FIG. 11e, the first surface of the silicon wafer 11, together with the pore walls, is covered uniformly by at least one layer of dielectric material having refractive index lower than that of silicon. Layer 18 layer can be, for example, silicon dioxide grown by the thermal oxidation of said silicon wafer 11 in an oxygen atmosphere at temperatures of 950–1300° C. The thickness of such a thermal oxide layer is well-controlled by the time of oxidation, according to well known semiconductor processes. In order to reduce oxidation-caused stress in such an MPSi film, the wafer may be annealed for 1 hour in a nitrogen atmosphere at temperatures of 400–800° C. Alternatively, layer 18 can be SiO$_2$, deposited, for example, by Chemical Vapor Deposition (CVD), Low Pressure Chemical Vapor Deposition (LPCVD), or atomic layer chemical vapor deposition (ALCVD). Although thermal oxidation is the least expensive technique, the CVD and especially LPCVD or ALCVD will produce lower stress layers. All other layers (16, 17 on the exemplary illustrative embodiment of FIG. 14e) of said at least one transparent layer can be deposited by, for example, CVD, LPCVD, ALCVD or MOCVD (Metalo-Organic Chemical Vapor Deposition) techniques. Said layers can be of SiO$_2$, Si$_3$N$_4$ or any other transparent dielectric material known to those skilled in the art. Alternatively, said layers (16, 17, 18 on the exemplary illustrative embodiment of FIG. 14e) can be sputtered or grown by any suitable technique known by those skilled in the art. Various other modifications of multilayer deposition processes may be suggested by those skilled in the art.

Figure 11F:
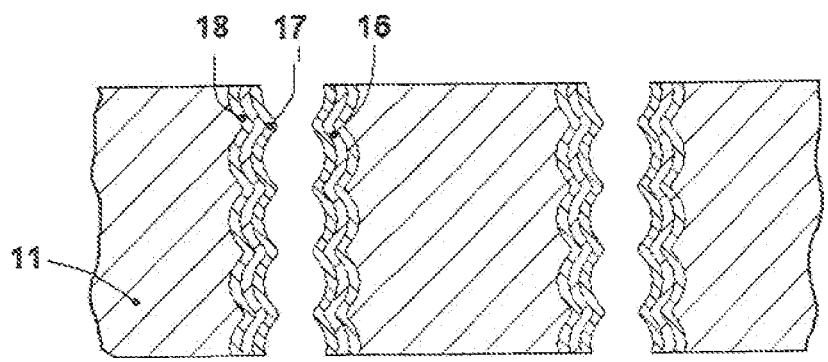

Referring now to FIG. 11f, the portion of the silicon wafer 11 not having the MPSi layer, but within the overall pattern boundaries, is removed. Removal of the said portion of wafer 11 can be done, for example, by alkaline etching of the bulk silicon from the second surface of silicon wafer 11 until the MPSi layer is reached. The etching can be done in, for example, a 40% by weight KOH in water solution at a temperature of in the range of 70 to 90° C., but preferably 75° to 80° C. Alternatively, the removal of said non-porous portion of wafer 11 can be done by, for example, by acidic etching of the second surface of silicon wafer 11 until the MPSi layer is reached. According to a further example arrangement, removal of said portion of wafer 11 can be done by, for example, the mechanical polishing of second surface of silicon wafer 11 until the MPSi layer is reached. According to a still further exemplary arrangement, removal of said non-porous portion of wafer 11 can be done by, for example, the chemical-mechanical polishing of the second surface of silicon wafer 11 until the MPSi layer is reached. In accordance to still another exemplary arrangement, the removal of said non-porous portion of wafer 11 can be done by, for example, reactive ion etching. It should be noted that mechanical or chemical-mechanical polishing of the second surface of said wafer can be used even after most of said portion of wafer 11 is removed by any of the aforementioned means in order to achieve the necessary flatness of the second surface of the final spectral filter. It should also be noted that polishing of the first surface of said wafer 11 can also be used at times in order to achieve the necessary flatness of the first surface of the final spectral filter. According to a further exemplary arrangement, the removal of said non-porous portion of wafer 11 can be done by Reactive Ion Etching, and particularly Deep Reactive Ion Etching.

In accordance with another exemplary arrangement, removal of the portion of the silicon wafer 11 that does not have the MPSi layer is carried out before the deposition of at least one layer of transparent low refractive index layer on the pore walls. This method can be advantageous for CVD, LPCVD, MOCVD or ALCVD methods of deposition, since the flow of gas can be directed through the pores, thus insuring the uniform coverage of pore walls through the entire depth of said pores.

If, in a particular spectral filter design, neither pore filling by absorptive or reflective material or coverage of either first, second or both filter surfaces by an antireflective structure is needed, the spectral filter fabrication will be completed at this stage. In the case of a spectral filter design in which no pore filling by absorptive or reflective material is required, but encapsulation of the porous layer is desired, the spectral filter can be processed further starting from the manufacturing step shown in FIG. 11*j* (see below). In the case of a spectral filter design in which no pore filling by absorptive or reflective material is used, but coating of either first, second or both surfaces of the MPSi layer is used, the spectral filter should be processed further starting from manufacturing step shown in FIG. 11*i* (see below).

Figure 11G:
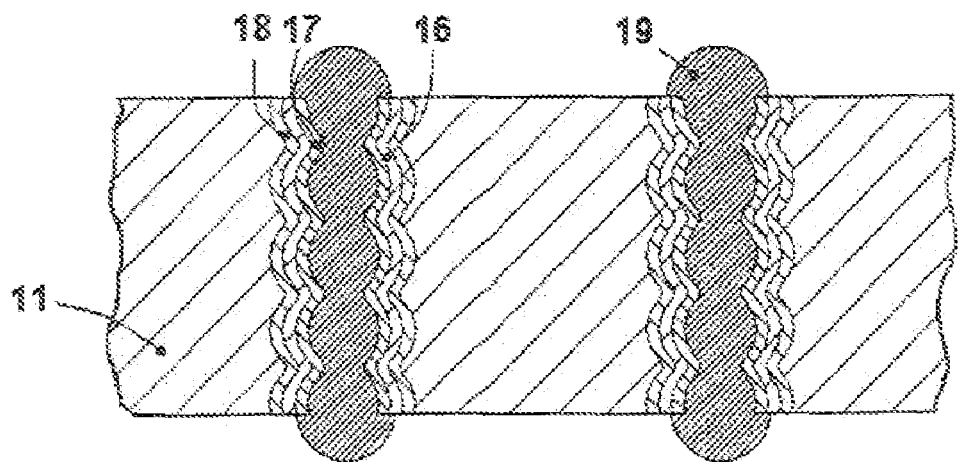

If pore filling by absorptive or reflective material is used in order to suppress the cross-coupling, additional fabrication steps are employed. Referring now to FIG. 11*g*, the pores of the free-standing MPSi layer are filled with absorptive or reflective material 19, for example, metal or any other absorptive or reflective material known to those skilled in the art. According to one illustrative arrangement, said pore filling can be accomplished by an electroplating or electroless plating process. The electroplating of the metal or alloy into pores may be done through the following exemplary process:

One of the first or second surfaces of the free standing MPSi layer, may be placed into physical contact with an electrode of the first polarity, placed into a plating bath filled by a plating solution having a composition optimized to get the correct metal or alloy composition plated into the pores uniformly;

placing the electrode of the second polarity into the same plating bath at a predetermined distance from said MPSi filter wafer, and applying a current between two electrodes.

The current will flow through the pores only, since the filter wafer is covered by at least one layer of dielectric material. Catalysts such as PdCl can be used in a plating electrolyte. Seed layers can be deposited onto the pore walls prior to the electroplating by AL CVD.

Alternatively, filling the pores with said reflective material can be accomplished by dipping the filter wafer into a melt of said reflective material. This is possible for certain types of reflective materials whose melting point is below both the melting or alloying points of silicon and any of the pore coating materials. Other methods of pore filling (like various modifications of Chemical Vapor Deposition technique) may be used instead. Alternatively, said absorptive or reflective material can be coated on the pore walls rather than filling the pores completely. For such an illustrative arrangement, CVD process is probably the best method of deposition of said material onto pore walls.

Figure 11H:
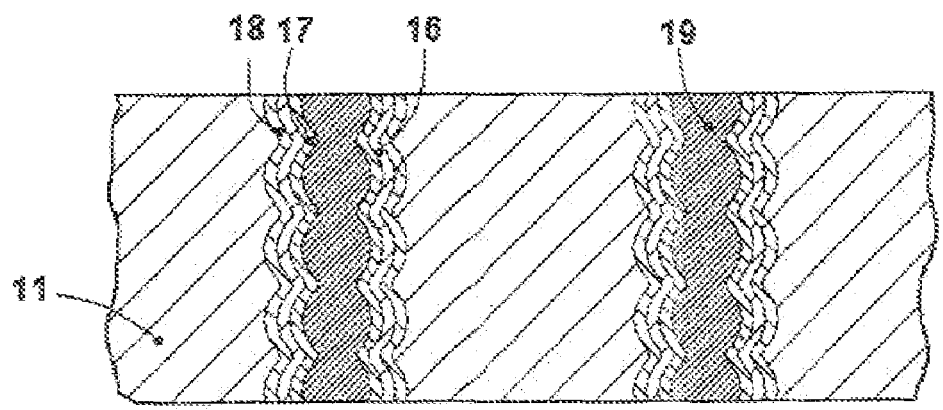

Once the pore filling step is completed, said absorptive or reflective material may not only fill the pores but also may cover at least partially the areas of silicon host on both broad surfaces of filter wafer. For the spectral filter to be functional, this excess material should be removed from both filter surfaces. Referring now to FIG. 11*h*, the excessive absorptive or reflective material is removed from both surfaces of the spectral filter wafer by mechanical polishing of both surfaces of the filter wafer until the silicon host 11 is reached. Alternatively, removal of said excessive material may be done by chemical-mechanical polishing of both surfaces of spectral filter wafer until the silicon host 11 is reached. Said removal of excessive material may alternatively be done through chemical or reactive ion etching. It should be also noted that additional fine polishing of both surfaces of said may also be employed to achieve desired flatness of both surfaces of the filter wafer.

Figure 11I:
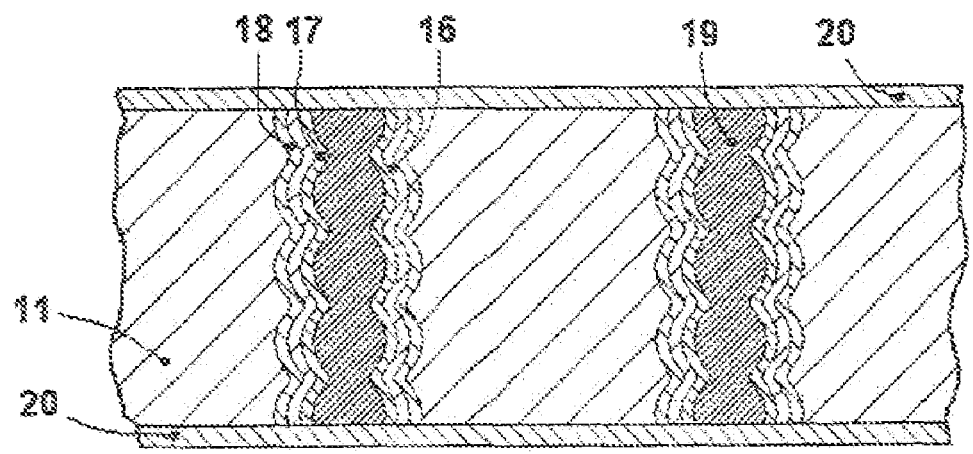

By following these exemplary process steps, the functional spectral filter layer will be fabricated. To minimize coupling and outcoupling losses, an additional, optional antireflection coating may be disposed on the first, second, or both surfaces of the spectral filter wafer. Referring now to FIG. 11*i*, said antireflection structure 20, which may consist of a single antireflection layer or a multilayer, is deposited on either one or both surfaces of the filter wafer by a physical or chemical vapor deposition process. Alternatively, said antireflective structure 20 may be sputtered or grown by any suitable technique known by those skilled in the art.

Figure 11J:
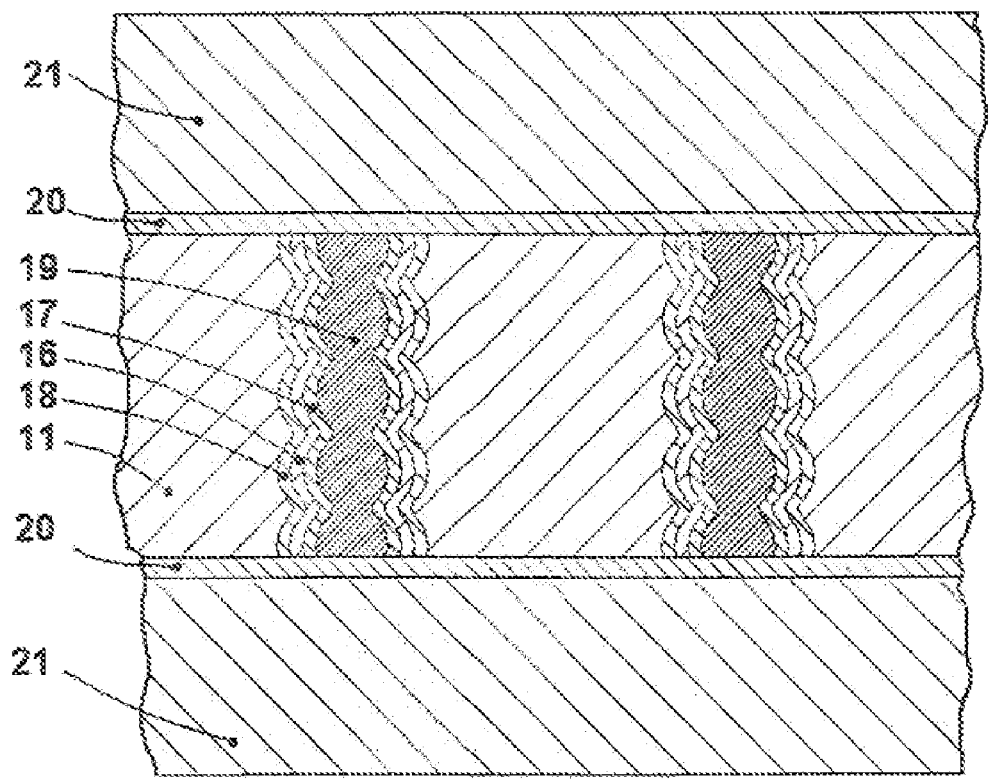

By following the exemplary illustrative non-limiting spectral filter manufacturing steps disclosed herein, a functional spectral filter can be produced. However, encapsulation of the filter layer in an optically and/or chemically compatible manner that will protect it from contaminants in the atmosphere may be required at times. Referring now to FIG. 11*j*, the first and second surfaces of the MPSi filter wafer 11 are covered by polished wafers 21 of a material that is transparent in the pass-band of the spectral filter. According to one illustrative embodiment, wafers 21 is of optical quality glass with an ionic surface treatment, and the attaching of wafer 21 to said silicon wafer is done by anodic bonding or thermal bonding. According to a still further exemplary arrangement, wafer 21 is of quartz, fused silica, or any other material transparent within the pass-band of said spectral filter and the attachment of wafer 21 to said silicon wafer is accomplished through epoxy around the edges of said filter, to insure that the working surface area of said filter is free from epoxies. Any other method of sealing the porous structure known to those skilled in the art can be used to encapsulate the MPSi layer in place of or in addition to the above example methods.

Figure 12A:
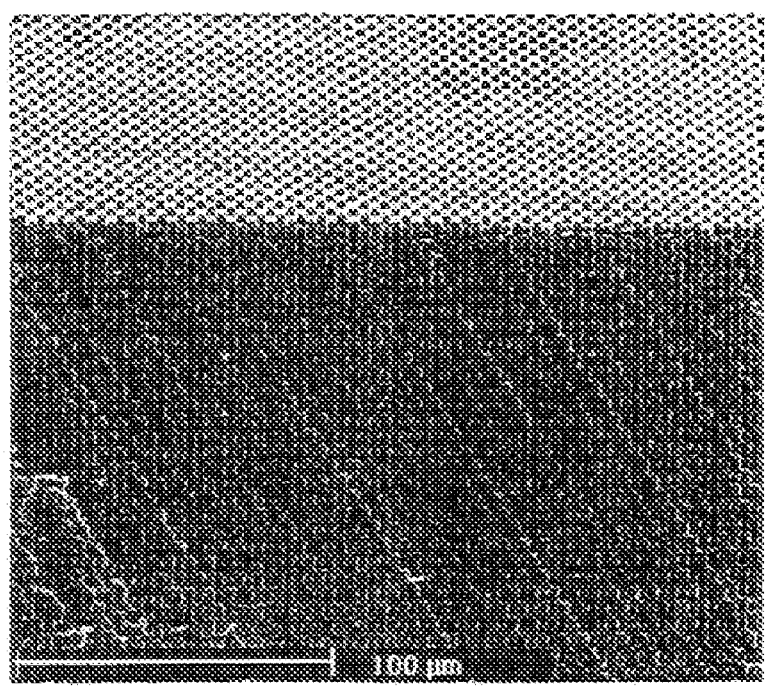
FIG. 12a–12c are illustrative exemplary non-limiting SEM images of different cross-sections of the MPSi filter wafer having a cubic symmetry of the pore array, near-square pores and pore cross sections periodically modulated along their depths.
Figure 12B:
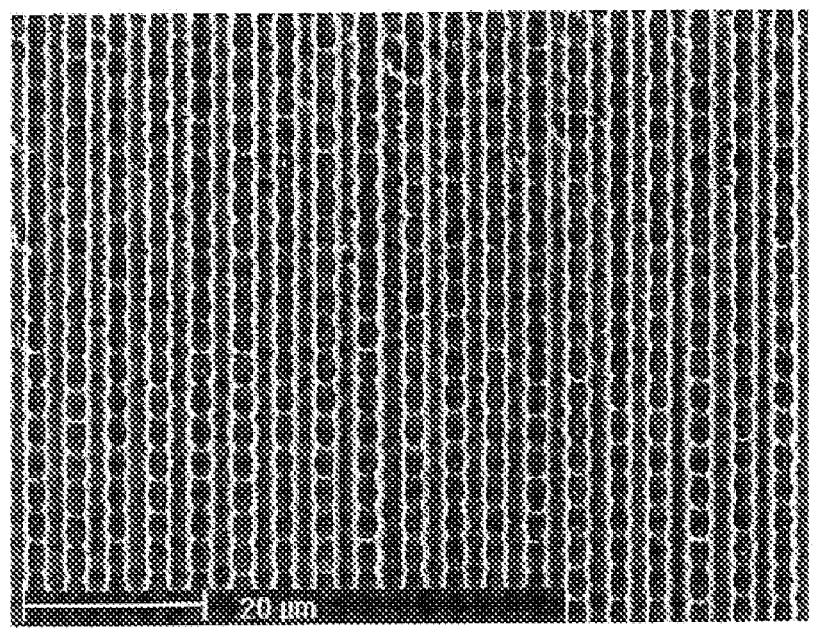
Figure 12C:
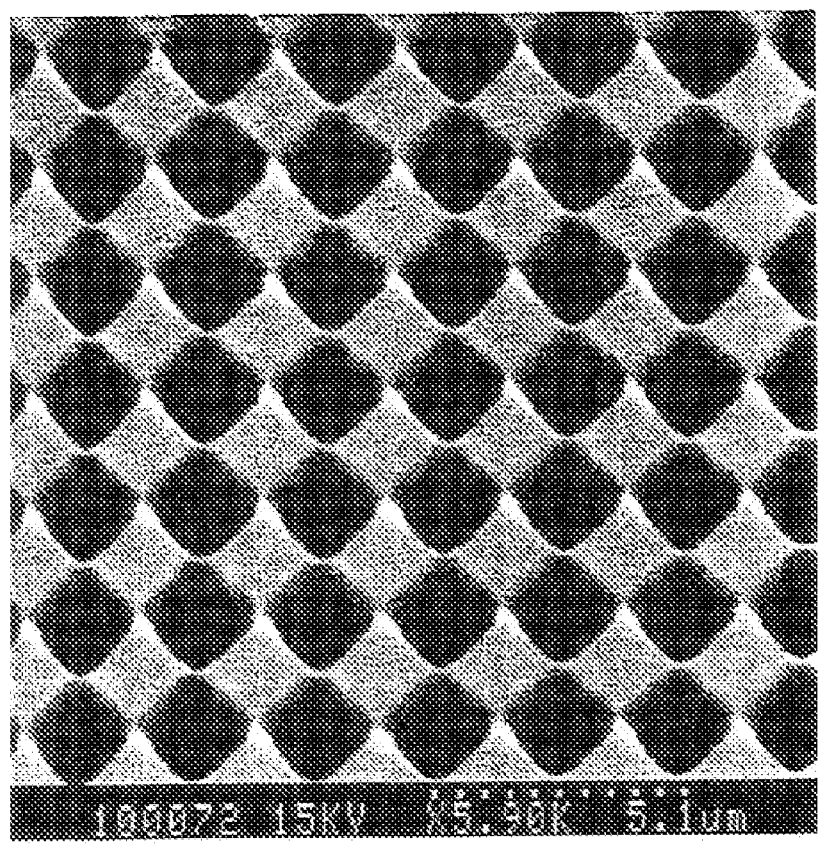
Figure 13A:
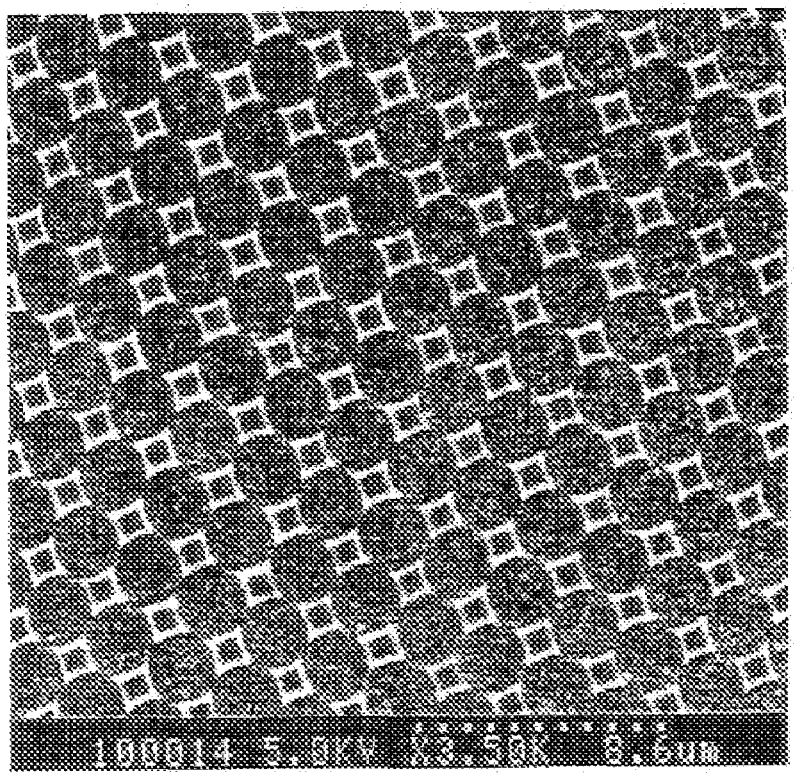
FIG. 13a–13b are illustrative exemplary non-limiting SEM images of different cross-sections of an MPSi filter wafer having cubic symmetry of the pore array, near-square pores and pores filled with copper.
Figure 13B:
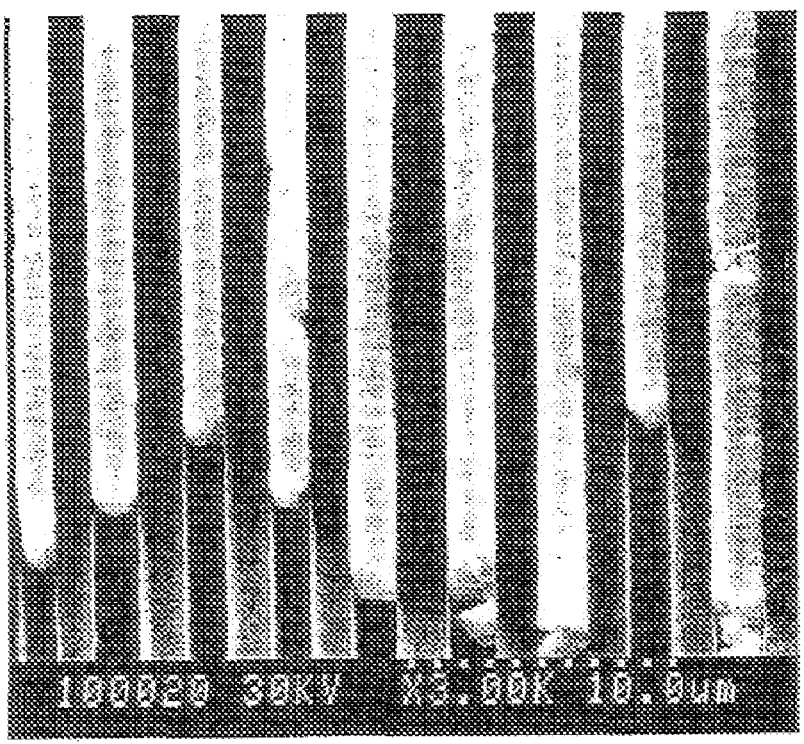

In additional examples, FIGS. 12*a*–12*c* show different views of a spectral filter structure (comprising MPSi array with near-square pores arranged into cubic symmetry pattern with pore cross-sections periodically modulated along their depths) and fabricated according to one of the herein disclosed manufacturing methods: FIG. 12*a* shows a scanning electron microscope (SEM) image of an MPSi layer cleaved on one plane in addition to the first surface, FIG. 12*b* gives an SEM image of MPSi array cleaved normal to the first surface, while FIG. 12*c* shows an SEM image of the first surface of the MPSi array. FIGS. 13*a*–13*b* give different views of a spectral filter structure fabricated according to another manufacturing method disclosed herein. This embodiment comprises an MPSi array with near-square pores arranged into a pattern of cubic symmetry with the pores filled completely with copper. FIG. 13*a* shows an SEM image of the first surface of the filter wafer, while FIG.

13b gives an SEM image of a metal-filled MPSi layer cleaved normal to the first surface.

Example Optical System

Figure 14:
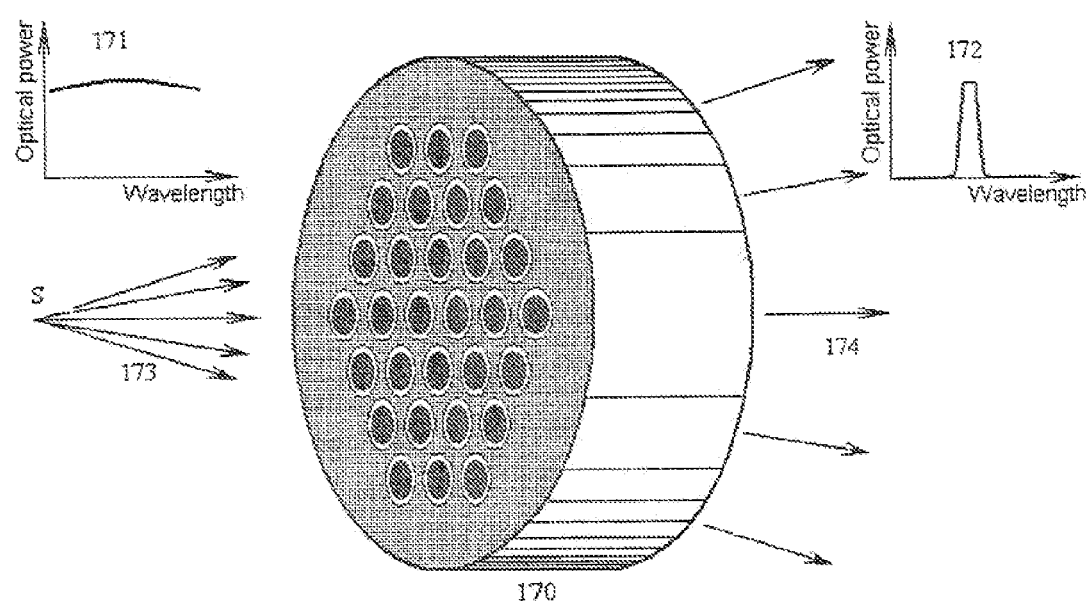
FIG. 14 is a perspective and schematic view of an exemplary illustrative non-limiting optical system using a spectral filter.
Figure 14A:
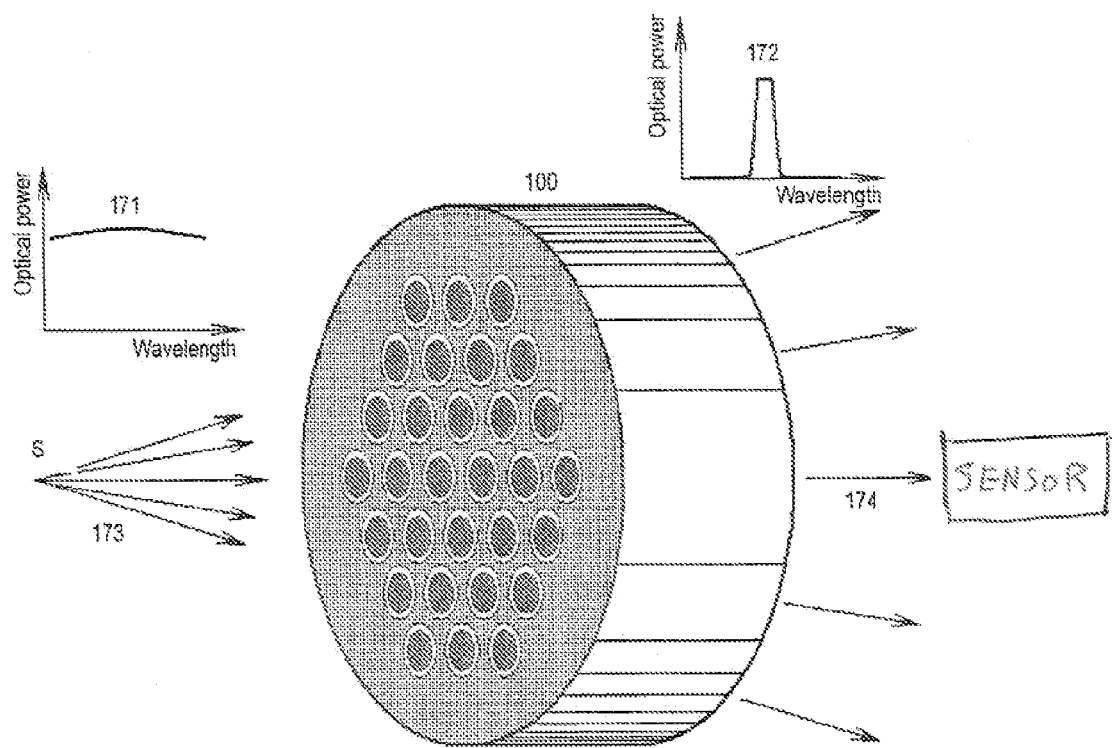
FIG. 14a shows the non-limiting system of FIG. 14 including a conventional photodetector.
Figure 15:
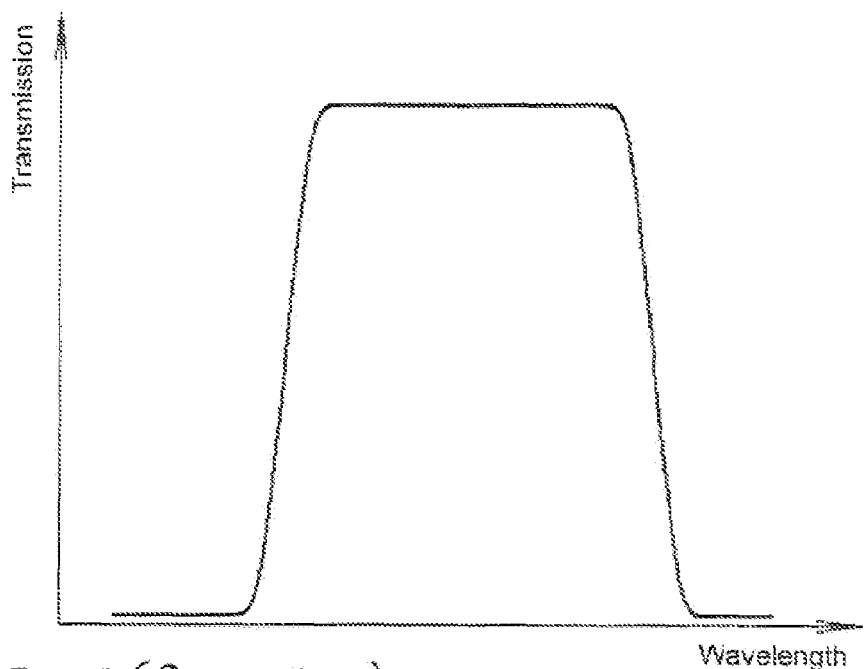
FIG. 15 shows an example conventional transmission bandpass filter characteristic.
Figure 16:
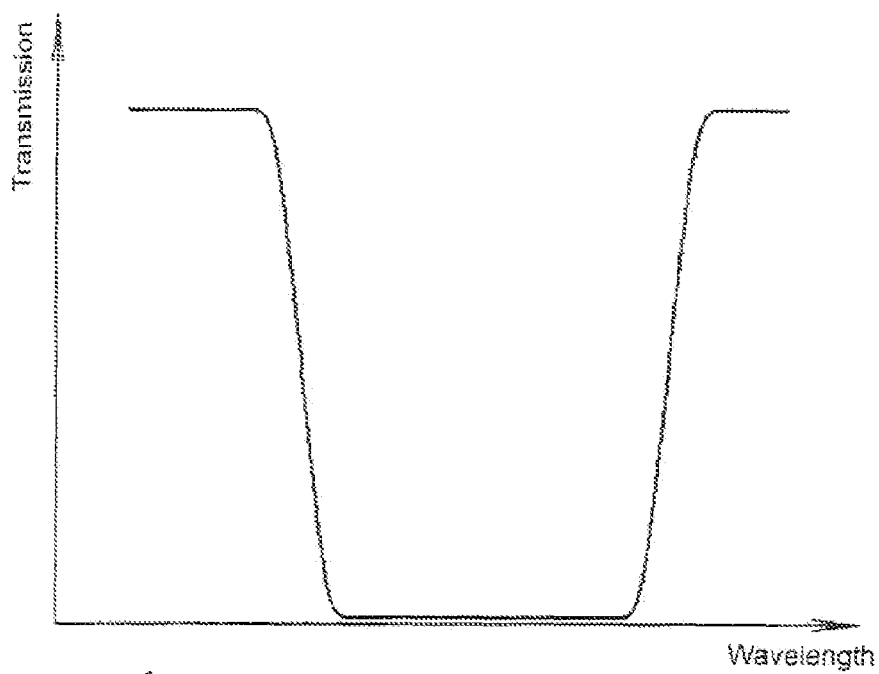
FIG. 16 shows an example conventional transmission bandblocking filter characteristic.
Figure 17:
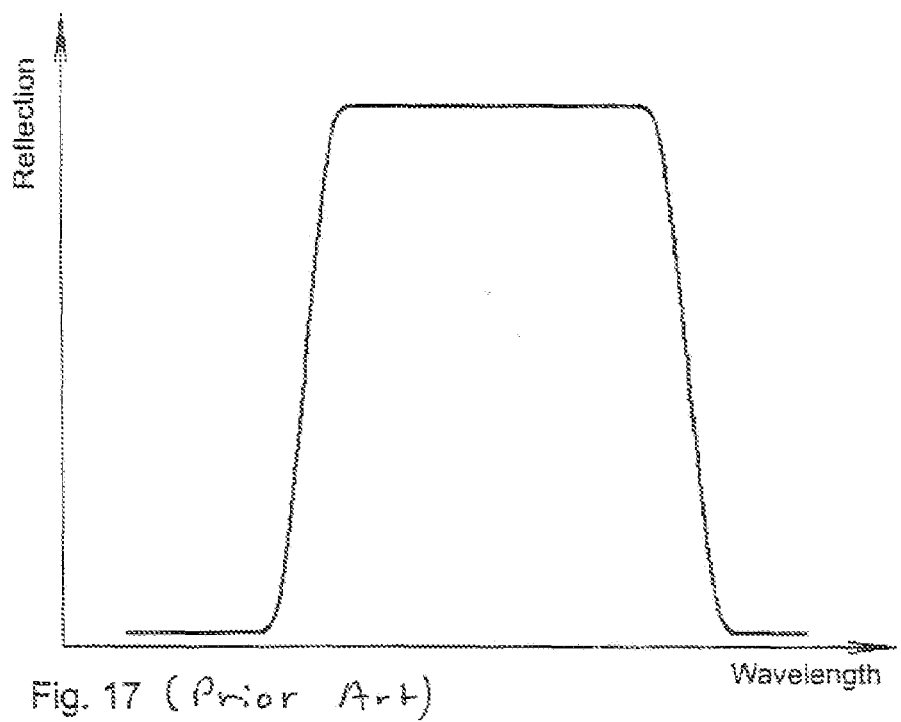
FIG. 17 shows an example conventional reflection bandpass filter characteristic.
Figure 18:
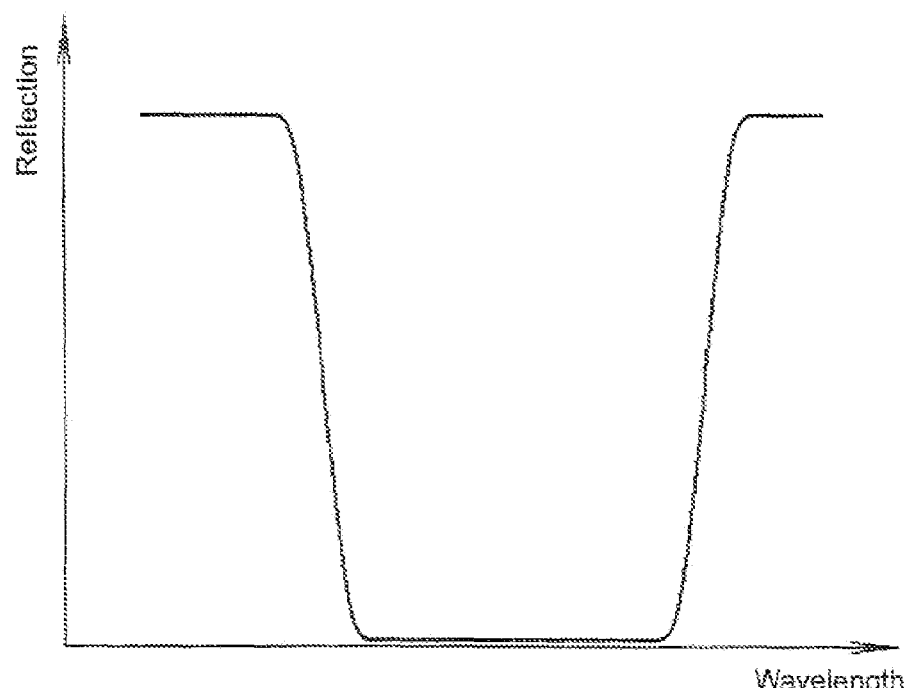
FIG. 18 shows an example conventional reflection bandblocking filter characteristic.
Figure 19:
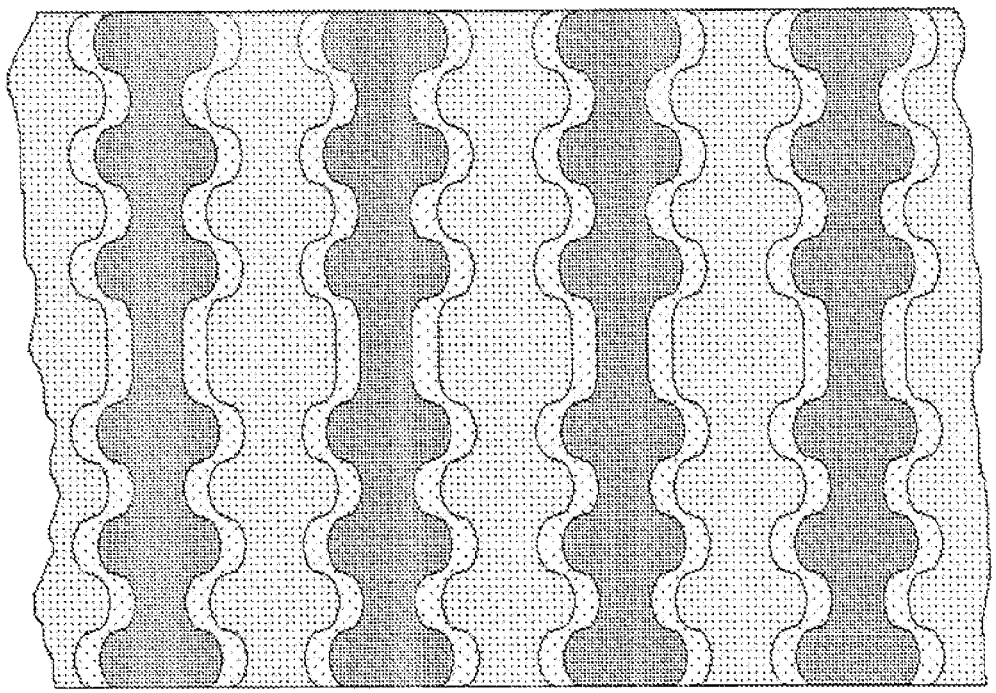
FIG. 19 shows example waveguides having more than one length segment of contiguous modulations along their depth separated by unmodulated segments.
Figure 20:
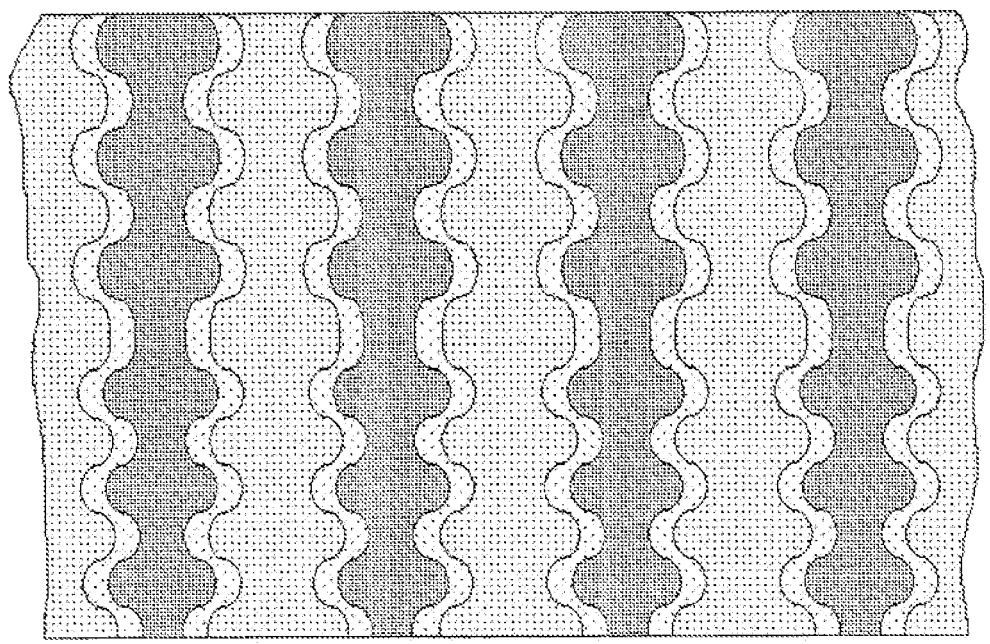
FIG. 20 shows waveguides with length segments of modulation of different periods and/or structures of modulation.
Figure 21:
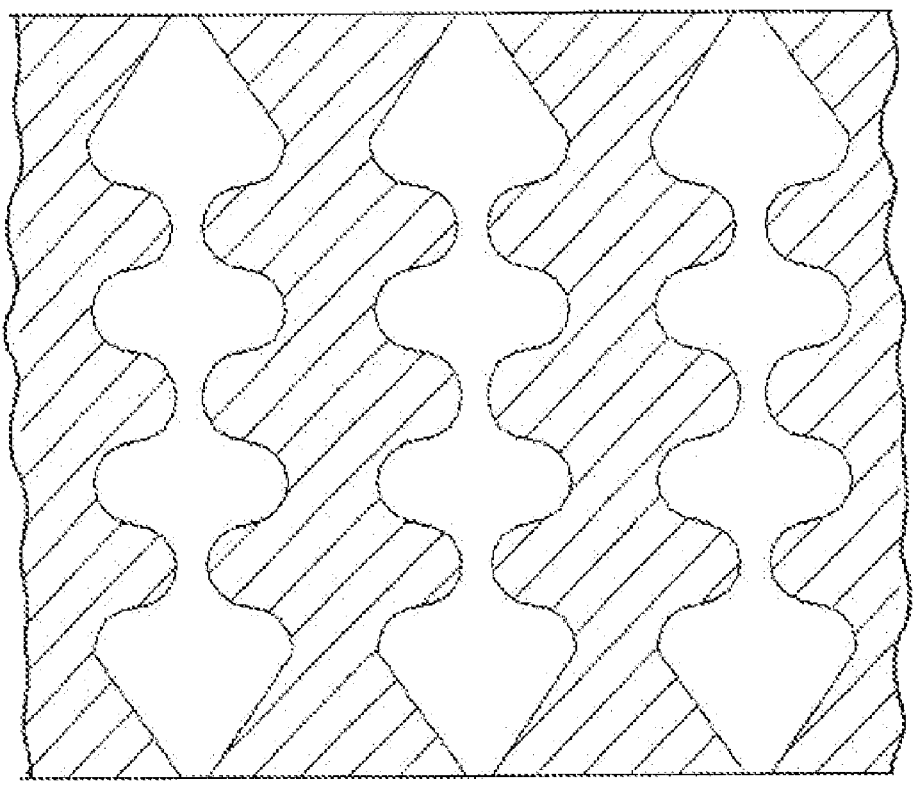
FIG. 21 shows example waveguides having at least one end tapered.

FIG. 14 shows an exemplary illustrative non-limiting optical system 170 employing a spectral filter 100 as shown in FIGS. 4, 5, and 7–10. In this example, a source of illumination S directs radiation 173 toward spectral filter 170. The source S in the example shown is relatively broadband in that it produces a wide range of radiation wavelengths with approximately uniform spectral power output 171. The spectral filter 100 shown in this example embodiment applies an optical filter transfer function to the incident radiation 173 (see transfer function graph shown in the upper right-hand corner of the FIG. 172). The radiation 174 that passes through the filter 100 is thus band-limited. This radiation may be directed toward an object to be illuminated, a process requiring particular wavelengths of radiation, or any other desired application.

As discussed above, the filters of FIGS. 4, 5 and 7-10 are stable, do not exhibit delamination problems and offer superior optical performance under tilted, convergent or divergent illumination. Such filters are useful for a wide variety of applications, including applications where current filter systems cannot provide acceptable performance. For instance, optical filters will be especially useful for optical communications. In particular, Wavelength Division Multiplexing (WDM) employs narrow bandpass filters to divide and combine signals coming from or into an optical fiber.

Dense channel spacing requires tight tolerances on the position, shape and width of the pass band of the filters. In contrast, at least some prior art filters may exhibit significant dependence of the described parameters on the divergence and tilting of light coming from the fiber or waveguide, thus requiring complicated aligning and collimation optics. Spectral filters as described herein will generally not exhibit such problems, thus yielding the opportunity to employ simpler and cheaper WDM systems. Other illustrative applications of the spectral filters include but are not limited to spectroscopy, astronomy, staring arrays, and temperature sensing.

While the invention has been described in connection with what is presently considered to be the most practical and preferred exemplary illustrative non-limiting implementations, the invention is not to be limited to the implementations disclosed herein, but on the contrary, is intended to cover various modifications and equivalent arrangements included within the scope of the claims.

The invention claimed is:

1. A passive spectral filter for selectively filtering or transmitting at least one predetermined spectral wavelength band, the passive spectral filter comprising:
  a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides thereof, the plural waveguides each supporting at least one waveguide mode in said predetermined spectral wavelength band, said spectral filter passively spectrally filtering light as said light propagates through said at least one waveguide mode.

2. A spectral filter of claim 1 wherein the substrate at least partially comprises porous semiconductor material, the semiconductor material remaining between the pores serving as a waveguide while the pores separate neighboring waveguides.

3. A spectral filter of claim 2 wherein said semiconductor material comprises macroporous silicon.

4. A spectral filter of claim 2 wherein said porous semiconductor material comprises porous indium phosphide.

5. A spectral filter of claim 2 wherein said porous semiconductor material comprises porous gallium arsenide.

6. A spectral filter of claim 1 wherein said substrate at least partially comprises oxidized porous semiconductor material, said oxidized semiconductor material between the pores serving as waveguides while the pores separate neighbor waveguides.

7. A spectral filter of claim 6 wherein said semiconductor material is oxidized macroporous silicon.

8. A spectral filter of claim 6, wherein said pores have substantially circular cross sections.

9. A passive spectral filter for selectively filtering or transmitting at least one predetermined spectral wavelength band, the passive spectral filter comprising:
  a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides thereof, the plural waveguides each supporting at least one waveguide mode in said predetermined spectral wavelength band, said spectral filter passively spectrally filtering light as said light propagates through said at least one waveguide mode,
  wherein said host wafer at least partially comprises porous semiconductor material, said semiconductor material remaining between the pores serving as a waveguide while said pores separate neighboring waveguides, and
  wherein said porous semiconductor material is chosen from the full possible range of alloys and compounds of zinc, cadmium, mercury, silicon, germanium, tin, lead, aluminum, gallium, indium, bismuth, nitrogen, oxygen, phosphorus, arsenic, antimony, sulfur, selenium and tellurium.

10. A passive spectral filter for selectively filtering or transmitting at least one predetermined spectral wavelength band, the passive spectral filter comprising:
  a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides, the plural waveguides each supporting at least one waveguide mode in said predetermined spectral wavelength band, said spectral filter passively spectrally filtering light as said light propagates through said at least one waveguide mode,
  wherein the wafer has a thickness of from about 1 to about 5000 times the characteristic lateral dimension of the waveguides.

11. A spectral filter for filtering or transmitting at least one predetermined spectral wavelength band comprising:
- a substrate or host wafer having a first and a second surface and further including plural, substantially uniform parallel uncoupled waveguides defined at least partially therethrough, the plural waveguides defining axes substantially perpendicular to the wafer first surface, the plural waveguides having coherently modulated cross-sections along at least some part of the length of said waveguides, the plural waveguides each supporting at least one waveguide mode at the predetermined spectral wavelength,
- wherein said host wafer at least partially comprises porous semiconductor material, said semiconductor material remaining between the pores serving as a waveguide while said pores separate neighboring waveguides, and
- wherein at least one layer of substantially transparent material at the transparency wavelength range of said spectral filter is made to coat the pore walls.

12. A spectral filter of claim 11, wherein each transparent layer of the transparent pore coating in said filter is a material selected from the group consisting of semiconductors, of semiconductor oxides, nitrides, oxynitrides and of metal oxides, nitrides oxinitrides and fluorides.

13. A spectral filter of claim 11, wherein the said at least one layer of the transparent pore coating has a refractive index less than that of the semiconductor host and serves as a waveguide cladding.

14. A passive spectral filter for selectively filtering or transmitting at least one predetermined spectral wavelength band, the passive spectral filter comprising:
- a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides thereof, the plural waveguides each supporting at least one waveguide mode in said predetermined spectral wavelength band, said spectral filter passively spectrally filtering light as said light propagates through said at least one waveguide mode,
- wherein the filter comprises a transmission band-pass filter.

15. A passive spectral filter for selectively filtering or transmitting at least one predetermined spectral wavelength band, the passive spectral filter comprising:
- a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides thereof, the plural waveguides each supporting at least one waveguide mode in said predetermined spectral wavelength band, said spectral filter passively spectrally filtering light as said light propagates through said at least one waveguide mode,
- wherein the filter comprises a transmission band-blocking filter.

16. A passive spectral filter for selectively filtering or transmitting at least one predetermined spectral wavelength band, the passive spectral filter comprising:
- a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides thereof, the plural waveguides each supporting at least one waveguide mode in said predetermined spectral wavelength band, said spectral filter passively spectrally filtering light as said light propagates through said at least one waveguide mode, and
- wherein the filter comprises a reflection band-pass filter.

17. A passive spectral filter for selectively filtering or transmitting at least one predetermined spectral wavelength band, the passive spectral filter comprising:
- a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides thereof, the plural waveguides each supporting at least one waveguide mode in said predetermined spectral wavelength band, said spectral filter passively spectrally filtering light as said light propagates through said at least one waveguide mode, and
- wherein the filter comprises a reflection band blocking filter.

18. A spectral filter for filtering or transmitting at least one predetermined spectral wavelength band comprising:
- a substrate or host wafer having a first and a second surface and further including plural, substantially uniform parallel uncoupled waveguides defined at least partially therethrough, the plural waveguides defining axes substantially perpendicular to the wafer first surface, the plural waveguides having coherently modulated cross-sections along at least some part of the length of the waveguides, the plural waveguides each supporting at least one waveguide mode at the predetermined spectral wavelength,
- wherein the centers of said waveguides are placed apart by a distance in the range of 0.5 μm to 30 μm, said distance being greater than the smallest lateral dimension of said waveguides.

19. A passive spectral filter for selectively filtering or transmitting at least one predetermined spectral wavelength band, the passive spectral filter comprising:
- a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides thereof, the plural waveguides each supporting at least one waveguide mode in said predetermined spectral wavelength band, said spectral filter passively spectrally filtering light as said light propagates through said at least one waveguide mode, wherein said waveguides are spatially ordered in the plane of said wafer into a predetermined pattern having predetermined symmetry.

20. A spectral filter of claim 19, wherein said waveguides are disposed such that the waveguide pattern has a complex order having complex symmetry.

21. A spectral filter for filtering or transmitting at least one predetermined spectral wavelength band comprising:

a substrate or host wafer having a first and a second surface and further including plural, substantially uniform parallel uncoupled waveguides defined at least partially therethrough, the plural waveguides defining axes substantially perpendicular to the wafer first surface, the plural waveguides having coherently modulated cross-sections along at least some part of the length of said waveguides, the plural waveguides each supporting at least one waveguide mode at the predetermined spectral wavelength, wherein said waveguides are spatially ordered in the plane of said wafer into a predetermined pattern having predetermined symmetry, wherein said symmetry is hexagonal symmetry.

22. A spectral filter for filtering or transmitting at least one predetermined spectral wavelength band comprising:

a substrate or host wafer having a first and a second surface and further including plural, substantially uniform parallel uncoupled waveguides defined at least partially therethrough, the plural waveguides defining axes substantially perpendicular to the wafer first surface, the plural waveguides having coherently modulated cross-sections along at least some part of the length of said waveguides, the plural waveguides each supporting at least one waveguide mode at the predetermined spectral wavelength, wherein said waveguides are spatially ordered in the plane of said wafer into a predetermined pattern having predetermined symmetry, wherein said symmetry is cubic symmetry.

23. A passive spectral filter for selectively filtering or transmitting at least one predetermined spectral wavelength band, the passive spectral filter comprising:

a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides thereof, the plural waveguides each supporting at least one waveguide mode in said predetermined spectral wavelength band, said spectral filter passively spectrally filtering light as said light propagates through said at least one waveguide mode, wherein said host wafer at least partially comprises porous semiconductor material, said semiconductor material remaining between the pores serving as a waveguide while said pores separate neighboring waveguides, and wherein said pores have substantially circular cross sections.

24. A spectral filter for filtering or transmitting at least one predetermined spectral wavelength band comprising:

a substrate or host wafer having a first and a second surface and further including plural, substantially uniform parallel uncoupled waveguides defined at least partially therethrough, the plural waveguides defining axes substantially perpendicular to the wafer first surface, the plural waveguides having coherently modulated cross-sections along at least some part of the length of the waveguides, the plural waveguides each supporting at least one waveguide mode at the predetermined spectral wavelength, wherein the host wafer at least partially comprises porous semiconductor material, the semiconductor material remaining between the pores serving as a waveguide while the pores separate neighboring waveguides, wherein said pores have approximately square cross sections.

25. A passive spectral filter for selectively filtering or transmitting at least one predetermined spectral wavelength band, the passive spectral filter comprising:

a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides, the plural waveguides each supporting at least one waveguide mode in said predetermined spectral wavelength band, said spectral filter passively spectrally filtering light as said light propagates through said at least one waveguide mode, and wherein said waveguides are made to exhibit a modulated lateral cross section over at least some part of the length of said waveguides.

26. A spectral filter of claim 25, wherein said modulation is made in the apodized form.

27. A spectral filter of claim 25, wherein said waveguides have more than one length segment of contiguous modulations along their depth separated by unmodulated segments.

28. A spectral filter of claim 27, wherein said length segments of modulation are of the same modulation and are spaced such that 180 degree optical phase shifts are formed between them, thus creating at least one narrow band of transmission through the filter.

29. A spectral filter of claim 27, wherein said length segments of modulation are of different periods and/or structures of modulation.

30. A spectral filter for filtering or transmitting at least one predetermined spectral wavelength band comprising:

a substrate or host wafer having a first and a second surface and further including plural, substantially uniform parallel uncoupled waveguides defined at least partially therethrough, the plural waveguides defining axes substantially perpendicular to the wafer first surface, the plural waveguides having coherently modulated cross-sections along at least some part of the length of said waveguides, the plural waveguides each supporting at least one waveguide mode at the predetermined spectral wavelength, and wherein said waveguides are made to exhibit a modulated lateral cross section over at least some part of the length of said waveguides, wherein said modulation is periodical with the period from about 50 nm to about 20 μm.

31. A spectral filter for filtering or transmitting at least one predetermined spectral wavelength band comprising:

a substrate or host wafer having a first and a second surface and further including plural, substantially uniform parallel uncoupled waveguides defined at least partially therethrough, the plural waveguides defining axes substantially perpendicular to the wafer first surface, the plural waveguides having coherently modulated cross-sections along at least some part of the length of said waveguides, the plural waveguides each supporting at least one waveguide mode at the predetermined spectral wavelength, and wherein said waveguides are made to exhibit a modulated lateral cross section over at least some part of the length of said waveguides, wherein said modulation is the superposition of two or more periodical modulations with periods from about 50 nm to about 20 μm each.

32. A passive spectral filter for selectively filtering or transmitting at least one predetermined spectral wavelength band, the passive spectral filter comprising:

a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides, the plural waveguides each supporting at least one waveguide mode in said predetermined spectral wavelength band, said spectral filter passively spectrally filtering light as said light propagates through said at least one waveguide mode, wherein said waveguides have at least one end tapered.

33. A spectral filter of claim 32 wherein said tapering is created such that the waveguide cross section is gradually increased when approaching said waveguide end with the rate of increase being in the range of 1 to 55 degrees with respect to the waveguide axis.

34. A spectral filter for filtering or transmitting at least one predetermined spectral wavelength band comprising:

a substrate or host wafer having a first and a second surface and further including plural, substantially uniform parallel uncoupled waveguides defined at least partially therethrough, the plural waveguides defining axes substantially perpendicular to the wafer first surface, the plural waveguides having coherently modulated cross-sections along at least some part of the length of said waveguides, the plural waveguides each supporting at least one waveguide mode at the predetermined spectral wavelength, wherein said host wafer at least partially comprises porous semiconductor material, said semiconductor material remaining between the pores serving as a waveguide while said pores separate neighboring waveguides, and wherein at least one layer of substantially absorbing or reflecting material is disposed on at least part of the pore length and said material is chosen to minimize the cross-coupling between the modes of neighboring waveguides.

35. A spectral filter of claim 34 wherein said at least one layer of absorbing or reflecting material comprises at least one layer of metal.

36. A spectral filter of claim 35 wherein said metal is chosen from the group consisting of Ag, Al, Cu, Ni, Fe, Au, In, Sn, Pt, Pd, Rh, Ru, conductive oxides, nitrides, oxynitrides and carbides of metals.

37. A spectral filter of claim 34 wherein said at least one layer of absorbing or reflecting material is an alloy chosen from the full possible range of alloys and compounds of iron, nickel, cobalt, boron, zinc, cadmium, mercury, silicon, germanium, tin, lead, aluminum, gallium, indium, bismuth, nitrogen, oxygen, phosphorus, arsenic, antimony, sulfur, selenium and tellurium.

38. A passive spectral filter for selectively filtering or transmitting at least one predetermined spectral wavelength band, the passive spectral filter comprising:

a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides thereof, the plural waveguides each supporting at least one waveguide in said predetermined spectral wavelength band, said spectral filter passively spectrally filtering light as light propagates through said at least one waveguide mode, and wherein an antireflective structure is made to coat at least one surface of the host wafer, said structure minimizing the reflection of light from said waveguide material over the said predetermined wavelength range such that at least some portion of said each waveguide length is left uncoated by said antireflective structure.

39. A spectral filter of claim 38 wherein said antireflection structure comprises just one layer of the material known as an antireflection layer.

40. A spectral filter of claim 38 wherein said antireflection structure comprises a multilayer antireflection coating.

41. A spectral filter for filtering or transmitting at least one predetermined spectral wavelength band comprising:

a substrate or host wafer having a first and a second surface and further including plural, substantially uniform parallel uncoupled waveguides defined at least partially therethrough, the plural waveguides defining axes substantially perpendicular to the wafer first surface, the plural waveguides having coherently modulated cross-sections along at least some part of the length of said waveguides, the plural waveguides each supporting at least one waveguide mode at the predetermined spectral wavelength, and wherein said wafer is disposed between two plates of material that is transparent in a predetermined spectral range.

42. A spectral filter of claim 41 wherein said plates are made with both surfaces substantially flat and parallel.

43. A spectral filter of claim 41 wherein at least one surface of at least one of said plates is of a lens-like shape.

44. A spectral filter of claim 41 wherein the filter surface comprises a material that is plastically deformed to a predetermined non-planar shape.

45. A spectral filter for filtering or transmitting at least one predetermined spectral wavelength band comprising:
a substrate or host wafer having a first and a second surface and further including plural, substantially uniform parallel uncoupled waveguides defined at least partially therethrough, the plural waveguides defining axes substantially perpendicular to the wafer first surface, the plural waveguides having coherently modulated cross-sections along at least some part of the length of the waveguides, the plural waveguides each supporting at least one waveguide mode at the predetermined spectral wavelength,
wherein said host wafer at least partially comprises oxidized porous semiconductor material, said oxidized semiconductor material between the pores serving as waveguides while the pores separate neighbor waveguides,
wherein at least one layer of substantially transparent material in the transparency wavelength range of said spectral filter is made to coat the pore walls.

46. A spectral filter of claim 45, wherein each layer of the transparent pore coating in said filter is material selected from the group consisting of semiconductor oxides, oxinitrides, nitrides and metal oxides, nitrides, oxinitrides and fluorides.

47. A spectral filter of claim 45, wherein the said at least one layer of the transparent pore coating has a refractive index less than that of the oxidized semiconductor host and serves as a waveguide cladding.

48. A passive spectral filter for selectively filtering or transmitting at least one predetermined spectral wavelength band, the passive spectral filter comprising:
a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides thereof, the plural waveguides each supporting at least one waveguide mode in said predetermined spectral wavelength band, said spectral filter passively spectrally filtering light as said light propagates through said at least one waveguide mode,
wherein said host wafer at least partially comprises oxidized porous semiconductor material, said oxidized semiconductor material between the pores serving as waveguides while the pores separate neighbor waveguides,
wherein said pores have approximately square cross sections.

49. A spectral filter for filtering or transmitting at least one predetermined spectral wavelength band comprising:
a substrate or host wafer having a first and a second surface and further including plural, substantially uniform parallel uncoupled waveguides defined at least partially therethrough, the plural waveguides defining axes substantially perpendicular to the wafer first surface, the plural waveguides having coherently modulated cross-sections along at least some part of the length of the waveguides, the plural waveguides each supporting at least one waveguide mode at the predetermined spectral wavelength,
wherein said host wafer at least partially comprises oxidized porous semiconductor material, said oxidized semiconductor material between the pores serving as waveguides while the pores separate neighbor waveguides,
wherein at least one layer of substantially absorbing or reflecting material is disposed on at least part of said pore length and said material is chosen to minimize the cross-coupling between the modes of neighboring waveguides.

50. A spectral filter of claim 49 wherein said at least one layer of absorbing or reflecting material comprises at least one layer of metal.

51. A spectral filter of claim 50 wherein said metal is chosen from the group consisting of Ag, Al, Cu, Ni, Fe, Au, In, Sn, Pt, Pd, Rh, Ru, and electrically conducting oxides, nitrides, carbides and oxynitrides of metals.

52. A spectral filter of claim 49 wherein said at least one layer of absorbing or reflecting material is an alloy chosen from the full possible range of alloys and compounds of iron, nickel, cobalt, boron, zinc, cadmium, mercury, silicon, germanium, tin, lead, aluminum, gallium, indium, bismuth, nitrogen, oxygen, phosphorus, arsenic, antimony, sulfur, selenium and tellurium.

53. A spectral filter for filtering or transmitting at least one predetermined spectral wavelength band comprising:
a substrate or host wafer having a first and a second surface and further including plural, substantially uniform parallel uncoupled waveguides defined at least partially therethrough, the plural waveguides defining axes substantially perpendicular to the wafer first surface, the plural waveguides having coherently modulated cross-sections along at least some part of the length of said waveguides, the plural waveguides each supporting at least one waveguide mode at the predetermined spectral wavelength, and
wherein said host wafer at least partially comprises porous semiconductor material, with the pores completely filled by a substantially transparent material, said filled pores comprising the cores of said waveguides and said semiconductor material between the pores functioning to separate neighboring waveguides.

54. A spectral filter of claim 53 wherein at least one layer of transparent material is disposed onto the pore walls between said pore-filling material and semiconductor material between the pores.

55. A spectral filter of claim 54 wherein said material comprising at least one layer disposed between pore-filling material and semiconductor material has a lower reflective index than the pore-filling material and serves as a waveguide cladding.

56. A spectral filter of claim 53 wherein said pore-filling material is selected from the full possible range of alloys and compounds of zinc, cadmium, mercury, silicon, germanium, tin, lead, aluminum, gallium, indium, bismuth, nitrogen, oxygen, phosphorus, arsenic, antimony, sulfur, iodide, selenium and tellurium.

57. A spectral filter of claim 53 wherein said pore-filling material is a germanium doped silica.

58. A spectral filter of claim 53, wherein said pores have substantially circular cross sections.

59. A spectral filter of claim 53, wherein said pores have approximately square cross sections.

60. A passive spectral filter for selectively filtering or transmitting at least one predetermined spectral wavelength band, the passive spectral filter comprising:
a substrate having a first surface and a second surface and further including a waveguide array comprising plural, substantially uniform and parallel, substantially mutually decoupled and thus independent waveguides defined at least partially therethrough, the plural waveguides defining axes substantially perpendicular to the wafer first surface, the plural waveguides having coherently modulated cross-sections along at least some part of lengths of the waveguides thereof, the plural waveguides each supporting at least one waveguide mode in said predetermined spectral wavelength band, said spectral filter passively spectrally filtering light as said light propagates through said at least one waveguide mode, and wherein said spectral filter is disposed contiguous to an optical detection means.

* * * * *